(12) United States Patent
Yoshitome et al.

(10) Patent No.: US 10,263,378 B2
(45) Date of Patent: Apr. 16, 2019

(54) METHOD FOR MANUFACTURING TERMINAL MEMBER, METHOD FOR CONNECTING TERMINAL MEMBER AND CONDUCTIVE MEMBER, TERMINAL MEMBER, AND WIRING MEMBER

(71) Applicant: Nissan Motor Co., Ltd., Yokohama-shi, Kanagawa (JP)

(72) Inventors: Masaaki Yoshitome, Kanagawa (JP); Naoto Taguchi, Kanagawa (JP); Kazuto Ueno, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/753,569

(22) PCT Filed: Aug. 27, 2015

(86) PCT No.: PCT/JP2015/074292
§ 371 (c)(1),
(2) Date: Feb. 20, 2018

(87) PCT Pub. No.: WO2017/033339
PCT Pub. Date: Mar. 2, 2017

(65) Prior Publication Data
US 2018/0287325 A1   Oct. 4, 2018

(51) Int. Cl.
*H02K 3/50* (2006.01)
*H01R 43/16* (2006.01)
(Continued)

(52) U.S. Cl.
CPC ........... *H01R 43/16* (2013.01); *H01R 25/162* (2013.01); *H01R 43/048* (2013.01); *H02K 3/50* (2013.01);
(Continued)

(58) Field of Classification Search
CPC .. H01R 43/0421; H01R 43/058; H01R 43/04; H01R 43/16; Y10T 29/49218; H02K 3/502; H02K 3/522; H02K 3/22; H02K 15/0062
See application file for complete search history.

(56) References Cited

U.S. PATENT DOCUMENTS 2,061,961 A * 11/1936 Culver ................. H01R 13/115
                                                                12/147 R
5,486,653 A *  1/1996 Dohi ...................... H01R 4/185
                                                                174/84 C
(Continued)

FOREIGN PATENT DOCUMENTS

CN         101047327 A      10/2007
JP       2007-185704 A       7/2007
(Continued)

*Primary Examiner* — Briggitte R. Hammond
(74) *Attorney, Agent, or Firm* — Global IP Counselors, LLP

(57) ABSTRACT

A method is provided for manufacturing a terminal member that is electrical conductive with a conductive member. The terminal member is formed by working a workpiece having a plate shape with a first surface and a second surface extending from one end toward the other end, by cutting out a recessed portion at the one end from the first surface to the second surface. In this method, the recessed portion is supported by being abutted against a supporting member, and a portion spaced from the recessed portion toward the other end side is fixed, and both side portions along the one end from the recessed portion are bent while being pressed from the first surface toward the second surface side, thereby forming, as a pair of conductive surfaces for conduction with the conductive member, second surface portions facing each other with the supporting member interposed therebetween.

10 Claims, 13 Drawing Sheets

(51) Int. Cl.
*H02K 5/22* (2006.01)
*H01R 43/048* (2006.01)
*H02K 3/52* (2006.01)
*H02K 15/00* (2006.01)
*H01R 25/16* (2006.01)
*H02K 15/04* (2006.01)

(52) U.S. Cl.
CPC ............... *H02K 3/522* (2013.01); *H02K 5/22* (2013.01); *H02K 15/0062* (2013.01); *H02K 15/0068* (2013.01); *H02K 15/04* (2013.01); *H02K 2203/09* (2013.01)

(56) References Cited

U.S. PATENT DOCUMENTS

| | | | | |
|---|---|---|---|---|
| 5,688,131 | A * | 11/1997 | Byfield, Jr. | H01R 4/64 439/883 |
| 5,709,565 | A * | 1/1998 | Okamoto | H01R 4/2429 439/395 |
| 5,741,164 | A * | 4/1998 | Yasuno | H01R 4/027 336/192 |
| 6,331,742 | B1 * | 12/2001 | Renkes | H01R 13/20 310/68 C |
| 6,402,543 | B1 * | 6/2002 | Abe | H01R 4/2404 439/407 |
| 6,737,772 | B2 * | 5/2004 | Tanaka | H01R 11/12 310/71 |
| 7,045,920 | B2 * | 5/2006 | Ohuchi | H02K 3/50 310/179 |
| 8,198,767 | B2 * | 6/2012 | Migita | H02K 3/522 310/68 R |
| 8,674,569 | B2 * | 3/2014 | Jang | H02K 3/522 310/194 |
| 9,484,782 | B2 | 11/2016 | Arai | |
| 2003/0173842 | A1 * | 9/2003 | Kobayashi | H02K 15/0056 310/71 |
| 2008/0293310 | A1 * | 11/2008 | Kageyama | H02K 23/38 439/883 |
| 2009/0212896 | A1 * | 8/2009 | Tamura | H01F 5/04 336/192 |
| 2010/0187923 | A1 | 7/2010 | Migita et al. | |
| 2011/0018376 | A1 | 1/2011 | Kataoka et al. | |
| 2011/0117769 | A1 * | 5/2011 | Okamura | H01R 4/185 439/395 |
| 2013/0328426 | A1 * | 12/2013 | Jang | H02K 3/28 310/71 |
| 2015/0188241 | A1 * | 7/2015 | Ozaki | H01R 4/027 324/207.25 |
| 2015/0357724 | A1 * | 12/2015 | Okuno | C25D 7/00 29/879 |

FOREIGN PATENT DOCUMENTS

| | | |
|---|---|---|
| JP | 2013-183544 A | 9/2013 |
| JP | 2015-126616 A | 7/2015 |
| KR | 10-2010-0059548 A | 6/2010 |
| RU | 2488213 C1 | 7/2013 |
| RU | 2527567 C2 | 9/2014 |
| WO | 2009/113633 A1 | 9/2009 |
| WO | 2012/070751 A1 | 5/2012 |
| WO | 2013/129377 A1 | 9/2013 |

* cited by examiner

METHOD FOR MANUFACTURING TERMINAL MEMBER, METHOD FOR CONNECTING TERMINAL MEMBER AND CONDUCTIVE MEMBER, TERMINAL MEMBER, AND WIRING MEMBER

CROSS-REFERENCE TO RELATED APPLICATIONS

This application is a U.S. National stage application of International Application No. PCT/JP2015/074292, filed Aug. 27, 2015.

BACKGROUND

Field of the Invention

The present invention relates to a method for manufacturing a terminal member, a method for connecting a terminal member and a conductive member, a terminal member and a wiring member.

Background Information

Conventionally, there is a device that connects a terminal corresponding to a terminal member, and an end portion of a conductive wire corresponding to a winding that is wound in a coil shape onto a divided core of a stator (for example, see Japanese Laid-Open Patent Application No. 2013-183544, which is herein referred to as Patent Document 1). In such a device, a conductive wire, and a terminal having an elongated central portion and a U-shaped bent structure for sandwiching a conductive wire at the distal end portion thereof, are press-bonded in a heated state.

SUMMARY

Here, there is a demand for a manufacturing method that is capable of further improving the productivity of the terminal member by simplifying the configuration of the terminal member. In addition, there is a demand for a connection method that is capable of more easily joining a terminal member and a winding without recourse to a special treatment such as heating. Additionally, there is a demand for a terminal member with greater rigidity to prevent deformations or the like at the time of assembly. Furthermore, there is also a demand for a wiring member, which includes a terminal member, with greater rigidity, to prevent breakage or the like of the component members.

In order to solve the problems described above, an object of the present invention is to provide a method for manufacturing a terminal member capable of significantly improving the productivity of the terminal member that is joined to a winding for electrical conduction therewith. Furthermore, another object of the present invention is to provide a method of connecting a terminal member and a winding that is capable of sufficiently joining a terminal member and a winding by means of a simple method. Furthermore, another object of the present invention is to provide a terminal member that is capable of increasing the rigidity of the entire terminal. Furthermore, another object of the present invention is to provide a highly rigid wiring member that is capable of preventing breakage of component members including a terminal member, even when stress is applied thereto.

The method for manufacturing a terminal member according to the present invention which achieves the objects described above is a method for manufacturing a terminal member for electrical conduction with a conductive member working a workpiece having a plate shape with a first surface and a second surface extending from one end toward the other end, by cutting out a recessed portion at the one end from the first surface to the second surface. In the method for manufacturing a terminal member, the recessed portion is supported by being abutted against a supporting member, and a portion spaced from the recessed portion toward the other end side is fixed, and both side portions along the one end from the recessed portion are bent while being pressed from the first surface toward the second surface side, thereby forming, as a pair of conductive surfaces for conduction with the conductive member, second surface portions facing each other with the supporting member interposed therebetween.

The method for connecting a conductive member and a terminal member according to the present invention which achieves the objects described above is a method for connecting a conductive member and a terminal member that has a pair of conductive surfaces having a plate shape with a first surface and a second surface extending from one end toward the other end, respectively, and projecting at the one end from the first surface to a side with the second surface, and opposite each other along a direction that intersects a direction from the one end toward the other end. In the method for connecting a terminal member and a conductive member, the conductive member is positioned between a pair of opposing conductive surfaces, and at least a portion of the pair of opposing conductive surfaces is pressed toward the conductive member and deformed to be connected with the conductive member.

The terminal member according to the present invention which achieves the objects described above is joined to a conductive member for electrical conduction therewith. The terminal member comprises a conductive portion and a supporting portion. The conductive portion comprises a pair of conductive surfaces having a plate shape with a first surface and a second surface extending from one end toward the other end, respectively projecting from the first surface to a side with the second surface, and opposite each other along a direction that intersects a direction from one end toward the other end. The supporting portion extends from the conductive portion toward the other end side and supports the conductive portion. Here, the supporting portion has a longer width along the direction in which the pair of the conductive surfaces face each other than that of the conductive portion.

The wiring member according to the present invention which achieves the objects described above comprises a terminal member and a conductive band member. The terminal member is provided with a conductive portion and a supporting portion. The conductive portion comprises a pair of conductive surfaces having a plate shape with a first surface and a second surface extending from one end toward the other end, respectively, and projecting from the first surface to a side with the second surface, and opposed to each other along a direction that intersects a direction from the one end toward the other end. The supporting portion extends from the conductive portion toward the other end side and supports the conductive portion. Here, the supporting portion has a longer width along the direction in which the pair of the conductive surfaces face each other than that of the conductive portion. The conductive band member comprises an elongated shape having conductivity, joins a plurality of terminal members along a longitudinal direction at a predetermined interval, and conducts the electric power supplied from outside to each of the terminal members.

DETAILED DESCRIPTION OF THE EMBODIMENTS

Figure 1A:
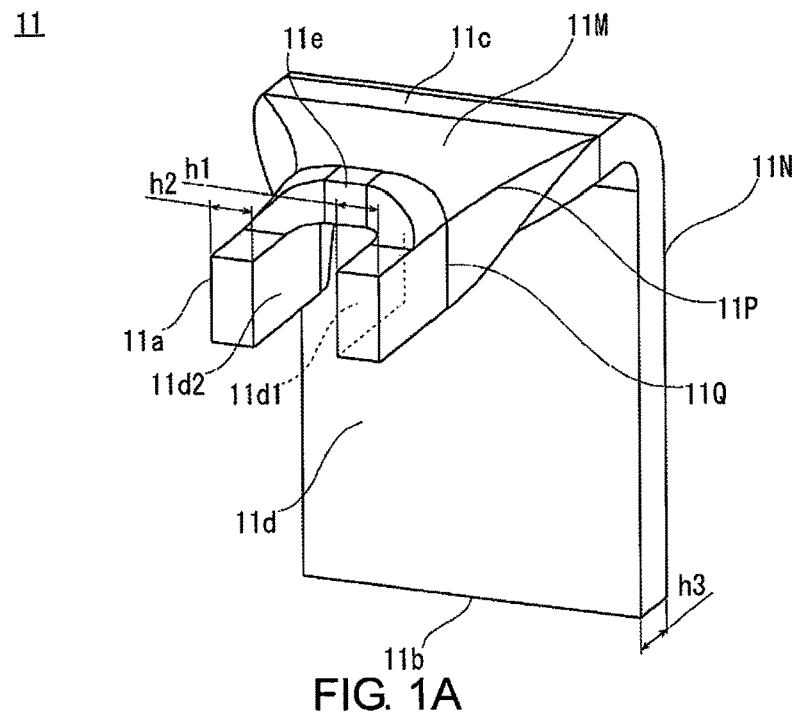
FIG. 1A is a perspective view of a terminal member according to a first embodiment as viewed from one side.

The first to the fourth embodiments according to the present invention will be described below, with reference to the appended drawings. In the explanations of the drawings, the same elements have been assigned the same reference symbols, and redundant explanations have been omitted. The sizes and ratios of the members in the drawing are exaggerated for the sake of convenience of explanation and may differ from the actual sizes and ratios.

First Embodiment

First, the configuration of a terminal member 11 manufactured using a manufacturing device 100 will be described with reference to FIG. 1.

Figure 1B:
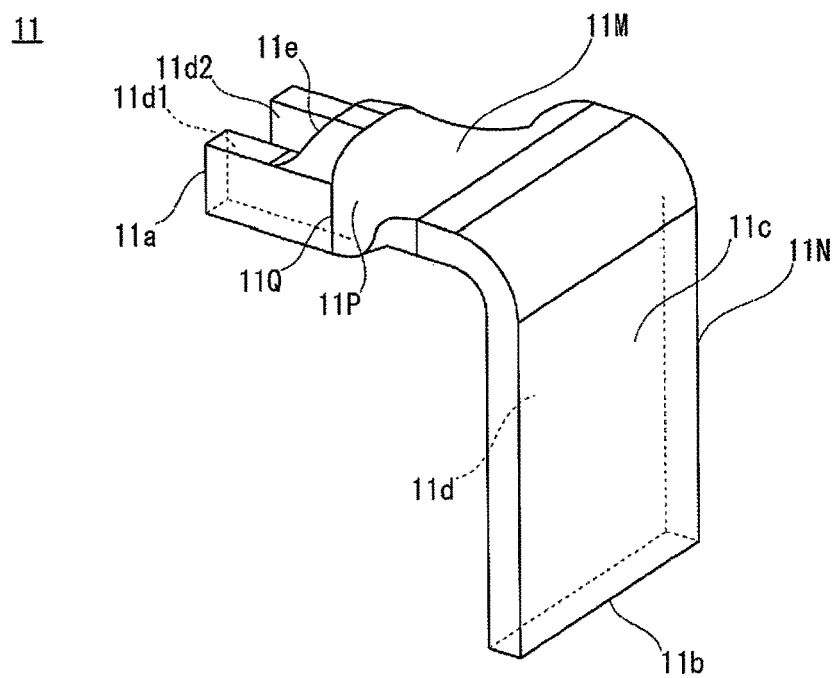
FIG. 1B is a perspective view of the terminal member illustrated in FIG. 1A as viewed from the other side.

FIG. 1 is a view illustrating the terminal member 11 according to the first embodiment. FIG. 1A is a perspective view illustrating the terminal member 11 from one side. FIG. 1B is a perspective view illustrating the terminal member 11 from the other side.

The terminal member 11 is a terminal joined to a winding 50 for electrical conduction therewith. In one embodiment, the terminal member 11 configures, for example, a bus ring (FIG. 5) according to the second embodiment, together with a conductive band member. The terminal member 11 comprises a conductive portion 11M that joins the winding 50 (FIG. 15) and a supporting portion 11N that supports the conductive portion 11M. The terminal member 11 comprises a plate shape extending from one end 11a toward the other end 11b and is provided with a front surface 11c and a rear surface 11d. The terminal member 11 is formed by being bent into an L shape such that the side with the rear surface 11d faces inward, such that the supporting portion 11N and the conductive portion 11M bound the bent portion. The terminal member 11 is made from a conductive metal, such as copper.

The conductive portion 11M comprises a pair of conductive surfaces (first conductive surface 11d1 and second conductive surface 11d2) that are branched in two from the side with the supporting portion 11N toward the one end 11a, and sandwich the winding 50. The first conductive surface 11d1 and the second conductive surface 11d2 respectively project from the front surface 11c of the conductive portion 11M toward the side with the rear surface 11d, and face each other. The portion that includes the first conductive surface 11d1 and that faces the side with the other end 11b, and the portion that includes the second conductive surface 11d2 and that faces the side with the other end 11b are respectively extended so as to be inclined from the supporting portion 11N toward the side with the conductive portion 11M. This inclined portion is configured from a portion bent in a crest fold shape (first deformed portion 11p) and a portion bent in a trough fold shape (second deformed portion 11q). The thickness of the portion including the first conductive surface 11d1 along the one end 11a (h1) and the thickness of the portion including the second conductive surface 11*d*2 along the one end 11*a* (h2) are both the same as the thickness (h3) between the front surface 11*c* and the rear surface 11*d* in the supporting portion 11N.

The supporting portion 11N extends from the conductive portion 11M toward the side with the other end 11*b* and supports the conductive portion 11M. The supporting portion 11N is also the portion that is joined to the conductive band member in, for example, the bus ring (FIG. 5) according to the second embodiment. The supporting portion 11N has a longer lateral width along the direction in which the pair of conductive surfaces, i.e., the first conductive surface 11*d*1 and the second conductive surface 11*d*2, face each other, than the lateral width of the conductive portion 11M.

The terminal member 11 according to the first embodiment described above provides actions and effects by means of the following configurations.

The terminal member 11 is joined to the winding 50 for electrical conduction therewith. The terminal member 11 comprises a conductive portion 11M and a supporting portion 11N. The conductive portion 11M comprises a pair of conductive surfaces (first conductive surface 11*d*1 and second conductive surface 11*d*2) having a plate shape extending from one end 11*a* toward the other end 11*b* and provided with a front surface 11*c* and a rear surface 11*d*, respectively projecting from the side with the front surface 11*c* to the side with the rear surface 11*d*, and opposite each other along a direction that intersects direction from the one end 11*a* toward the other end 11*b*. The supporting portion 11N extends from the conductive portion 11M toward the side with the other end 11*b* and supports the conductive portion 11M. Here, the supporting portion 11N has a longer width along the direction in which the pair of conductive surfaces, the first conductive surface 11*d*1 and the second conductive surface 11*d*2, face each other, than that of the conductive portion 11M.

According to a terminal member 11 configured in this manner, the width of the supporting portion 11N is thicker than the width of the conductive portion 11M. Therefore, since the terminal member 11 is able to sufficiently support the conductive portion 11M that joins the winding 50 by means of the supporting portion 11N having a thicker width than the conductive portion 11M, it is possible to increase the rigidity of the entire terminal.

Furthermore, the terminal member 11 is formed such that the portion that includes the first conductive surface 11*d*1 and that the side with faces the other end 11*b*, and the portion that includes the second conductive surface 11*d*2 and that the side with faces the other end 11*b* are respectively extended so as to be inclined from the supporting portion 11N toward the side with the conductive portion 11M, with respect to the rear surface 11*d*.

According to a terminal member 11 configured in this manner, the space between the supporting portion 11N and the conductive portion 11M is connected by an inclined portion, and it is possible to absorb, while transmitting to the supporting portion 11N, stress that is applied, for example, from the conductive portion 11M that joins the winding 50 to the supporting portion 11N, by the inclined portion. Therefore, the terminal member 11 can increase the rigidity of the entire terminal, from the conductive portion 11M to the supporting portion 11N.

Furthermore, the terminal member 11 is formed such that the space between the supporting portion 11N and the conductive portion 11M is connected by a portion bent in a crest fold shape (first deformed portion 11*p*) and a portion bent in a trough fold shape (second deformed portion 11*q*).

According to a terminal member 11 configured in this manner, it is possible to accurately form a terminal including a pair of conductive surfaces, the first conductive surface 10*d*1 and the second conductive surface 10*d*2, and to increase the rigidity of the entire terminal, by the crest fold shape and the trough fold shape between the supporting portion 11N and the conductive portion 11M.

Furthermore, the terminal member 11 is formed such that the thickness of the portion of the conductive portion 11M that includes the first conductive surface 11*d*1 along the one end 11*a* (h1) and the thickness of the portion that includes the second conductive, surface 11*d*2 along the one end 11*a* (h2) to be respectively equal to or greater than the thickness (h3) between the front surface 11*c* and the rear surface 11*d* in the supporting portion 11N.

According to a terminal member 11 configured in this manner, it is possible to make the rigidity of the portion on the distal end side including the first conductive surface 11*d*1 (conductive portion 11M including the first conductive surface 11*d*1) and of the portion on the distal end side including the second conductive surface 11*d*2 (conductive portion 11M including the second conductive surface 11*d*2) to be respectively equal to or greater than the rigidity of the proximal end side portion (supporting portion 11N).

Furthermore, the terminal member 11 is formed in an L shape from the supporting portion 11N to the conductive portion 11M, such that the side with the rear surface 11*d* faces inward.

According to a terminal member 11 configured in this manner, it is possible to form the entire terminal to be smaller compared with when the terminal is formed extending linearly from the supporting portion 11N to the conductive portion 11M. Furthermore, the terminal member 11 comprises a pair of conductive surfaces, the first conductive surface 11*d*1 and the second conductive surface 11*d*2, on the inward side (inner side) of the L shaped bend. Therefore, in the terminal member 11, it is possible to avoid interference between the pair of conductive surfaces, the first conductive surface 11*d*1 and the second conductive surface 11*d*2, and a structure disposed on the outward side (outer side) of the terminal member 11.

Next, the method of manufacturing the terminal member 11 using the manufacturing device 100 as well as the manufacturing device 100 will be described with reference to FIG. 2 and FIG. 3.

Figure 2A:
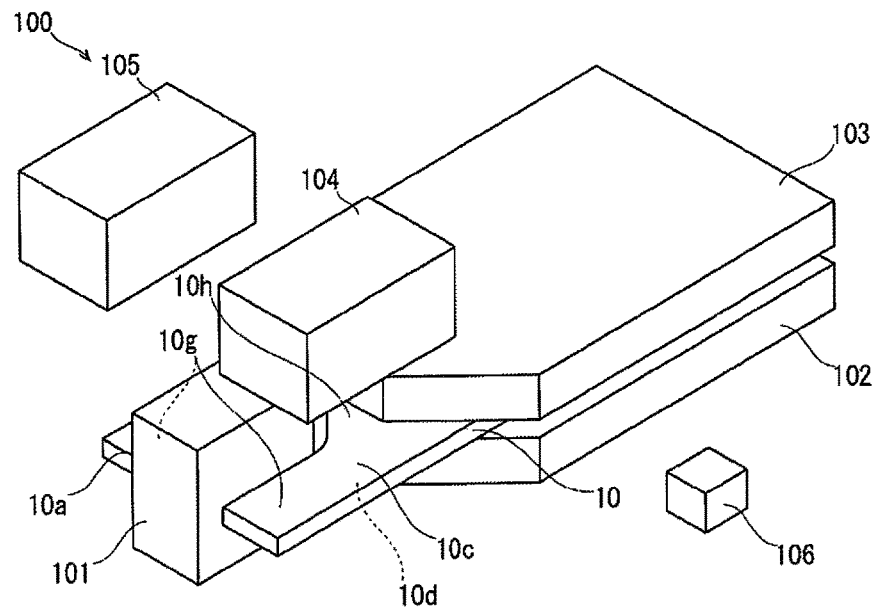
FIG. 2A is a perspective view illustrating a method for manufacturing a terminal member using the manufacturing device according to the first embodiment, in a state in which the workpiece is attached to the manufacturing device.
Figure 2B:
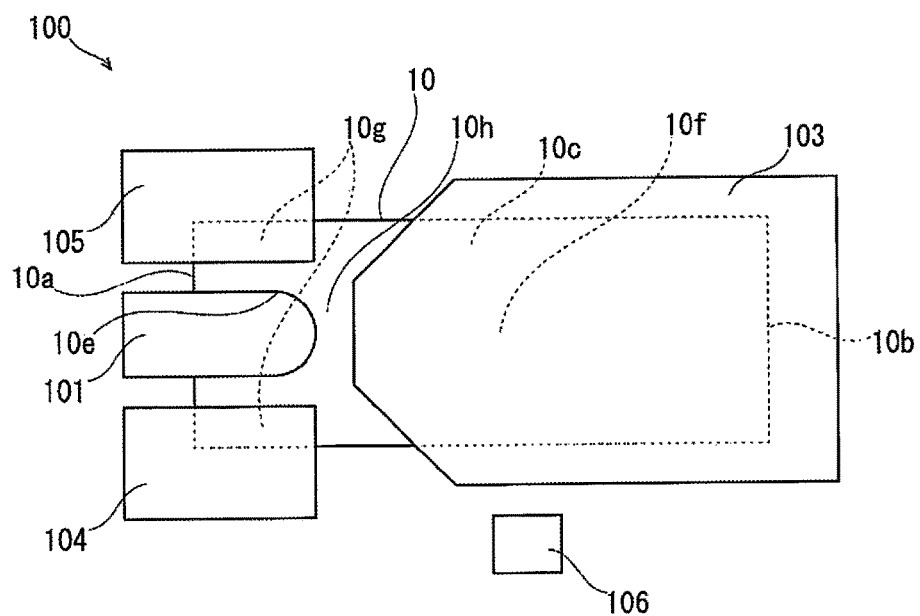
FIG. 2B is a top view illustrating the method for manufacturing the terminal member using the manufacturing device according to the first embodiment, in a state in which the workpiece is attached to the manufacturing device.
Figure 3A:
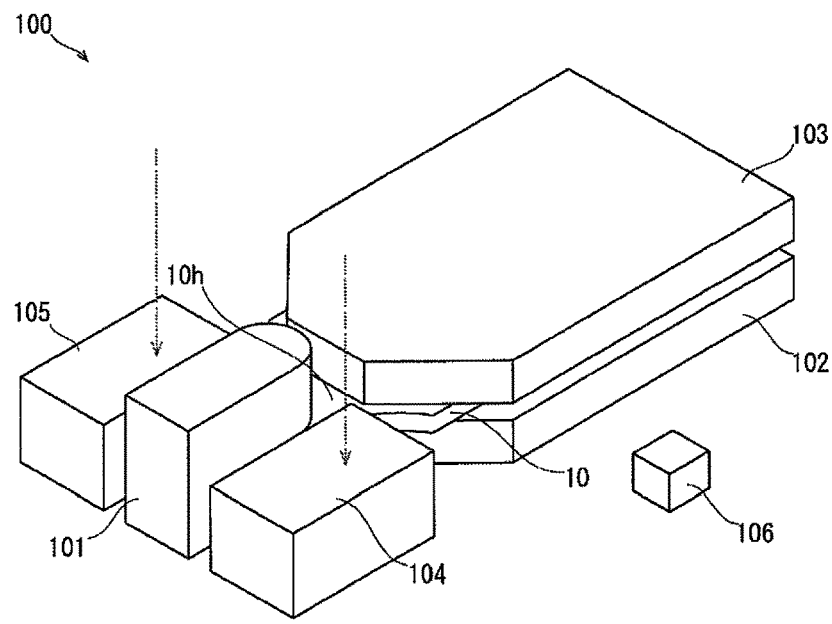
FIG. 3A is a perspective view, following FIG. 2, illustrating a state in which the workpiece is press-worked by the manufacturing device.
Figure 3B:
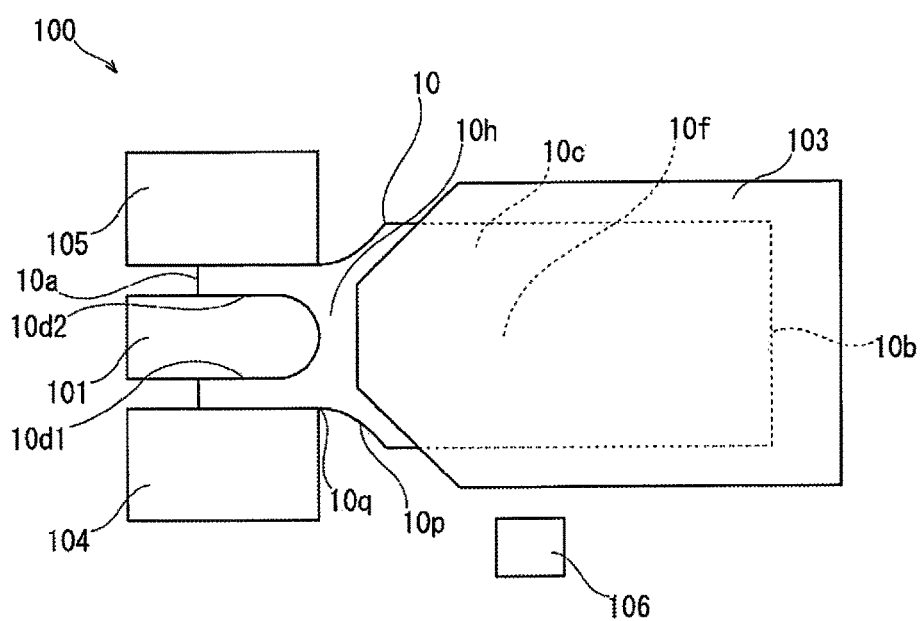
FIG. 3B is a top view of the workpiece of FIG. 3A after being press-worked by the manufacturing device.

FIG. 2 is a view illustrating the method for manufacturing a terminal member 11 using the manufacturing device 100 according to the first embodiment, showing the state in which the workpiece 10 is attached to the manufacturing device 100. FIG. 2A is a perspective view showing said state. FIG. 2B is a top view showing said state. Following FIG. 2, FIG. 3 shows a state in which the workpiece 10 is press-worked by the manufacturing device 100. FIG. 3A is a perspective view showing said state. FIG. 3B is a top view showing said state.

The method for manufacturing the terminal member 11 is for the manufacture of a terminal member 11 for electrical conduction with a winding 50, by working a workpiece (workpiece 10). The workpiece 10 has a plate shape extending from one end 10*a* toward the other end 10*b*, and has a front surface 10*c* and a rear surface 10*d*, and which is provided, at the one end 10*a*, with a recessed portion 10*e* that is cut out and recessed from the front surface 10*c* to the rear surface 10*d*. The manufacturing device 100 embodies the method for manufacturing the terminal member 11 described above.

The configuration of the manufacturing device 100 for manufacturing the terminal member 11 will now be described.

The manufacturing device 100 comprises a supporting member 101 that supports the workpiece 10 at the recessed portion 10e, a lower supporting member 102 and an upper supporting member 103 that sandwich and fix a fixing region 10f of the workpiece 10 from above and below, a right pressing member 104 and a left pressing member 105 that press a pair of pressed regions 10g of the workpiece 10, and a controller 106 for controlling the working of the workpiece 10, as illustrated in FIG. 2.

The supporting member 101 supports the workpiece 10 at the recessed portion 10e. The supporting member 101 corresponds to a so-called nest. The supporting member 101 has a plate shape, and is disposed along the vertical direction so as to stand upright. One side surface (right side in FIG. 2B) of the supporting member 101 in the short side direction is curved in a semicircular shape to match the shape of the recessed portion 10e of the workpiece 10 to be abutted there against. The recessed portion 10e of the workpiece 10 is inserted and fitted to the portion of the supporting member 101 that is curved in a semicircular shape.

The lower supporting member 102 and the upper supporting member 103 sandwich and fix a fixing region 10f of the workpiece 10 (region spaced from the recessed portion 10e of the workpiece 10 toward the side with the other end 10b) from above and below. The lower supporting member 102 has a plate shape, and is disposed along the horizontal direction. The lower supporting member 102 is primarily formed by cutting out both sides of the end portion on one side along the longitudinal direction (left side in FIG. 2B) to match the shape of the fixing region 10f of the workpiece 10. The upper supporting member 103 is shaped in the same manner as the lower supporting member 102. The upper supporting member 103 and the lower supporting member 102 are respectively spaced from the opposing supporting member 101 in the horizontal direction (left side in FIG. 2B) by a length corresponding to the portion of the unpressed region 10h of the workpiece 10 (region of the portion of the workpiece 10 to be bent facing the side with the other end 10b), as illustrated in FIG. 2B.

The right pressing member 104 and the left pressing member 105 press the pair of pressed regions 10g of the workpiece 10 (regions further toward the two sides along the one end 10a than the recessed portion 10e). The right pressing member 104 and the left pressing member 105 correspond to so-called punches. The right pressing member 104 has a rectangular parallelepiped shape and presses the pressed region 10g on the lower side of the workpiece 10 shown in FIG. 2B of the pair of pressed regions 10g. The right pressing member 104 maintains a state of being spaced from the supporting member 101 with respect to the horizontal direction along the one end 10a (lower side in FIG. 2B) by the thickness of the workpiece 10 (h3). The right pressing member 104 is moved in the vertical direction by a single-axis linear moving stage.

The left pressing member 105 has the same shape as the right pressing member 104. The left pressing member 105 presses the pressed region 10g on the upper side of the workpiece 10 shown in FIG. 2B of the pair of pressed regions 10g. The left pressing member 105 maintains a state of being spaced from the supporting member 101 with respect to the horizontal direction along the one end 10a (upper side in FIG. 2B) by the thickness of the workpiece 10 (h3). The left pressing member 105 is moved in the vertical direction together with the right pressing member 104 by the single-axis linear moving stage.

The right pressing member 104 and the left pressing member 105 may be configured as one member. Specifically, for example, the top and bottom of a pressing member formed in a U shape may be disposed upside down, and the distal end, which is branched in two, may be configured as a pair of pressing portions (right pressing portion and left pressing portion).

The controller 106 controls the working of the workpiece 10. The controller 106 controls the operation of the linear moving stage on which the right pressing member 104 and the left pressing member 105 are mounted. The controller 106 comprises a ROM, a CPU, and a RAM. A control program related to the working of the workpiece 10 is stored in the ROM (Read Only Memory). The control program contains information related to the movement distance, the movement speed and the like of the right pressing member 104 and the left pressing member 105. The CPU (Central Processing Unit) of the controller 106 controls the driving of the linear moving stage. Various data related to the linear moving stage under control are temporarily stored in the RAM (Random Access Memory). The data are, for example, related to the movement distance of the linear moving stage.

The method for manufacturing the terminal member 11 using the manufacturing device 100 will now be described.

FIG. 2 illustrates the state in which the workpiece 10 is attached to the manufacturing device 100 before the workpiece 10 is worked. The supporting member 101 supports the recessed portion 10e of the workpiece 10 in contact therewith. The lower supporting member 102 and the upper supporting member 103 sandwich and fix the fixing region 10f spaced from the recessed portion 10e of the workpiece 10 toward the side with the other end 10b. The right pressing member 104 and the left pressing member 105 are on standby above the pair of pressed regions 10g further toward the two sides along the one end 10a than the recessed portion 10e.

FIG. 3 illustrates the state in which the workpiece 10 is press-worked using the manufacturing device 100 after the workpiece 10 is worked. The right pressing member 104 and the left pressing member 105 cause the pair of pressed regions 10g of the workpiece 10 to be placed along the supporting member 101 and press and bend the pair of pressed regions from the front surface 10c toward the side with the rear surface 10d only once. The rear surface 10d portions facing each other with the supporting member 101 interposed therebetween become a pair of conductive surfaces that face each other (first conductive surface 10d1 and second conductive surface 10d2).

Here, the right pressing member 104 and the left pressing member 105 press portions of the workpiece 10 to be bent, excluding the portion that faces the side with the other end 10b (unpressed region 10h). The unpressed region 10h deforms accompanying the bending of the adjacent pair of pressed regions 10g. Therefore, since the side with the one end 10a spaced from the fixing region 10f is more greatly bent than the side with the other end 10b adjacent to the fixing region 10f, which is fixed and is not easily deformed, the unpressed region 10h of the workpiece 10 is bent to be inclined from the side with the other end 10b toward the side with the one end 10a.

In addition, the right pressing member 104 and the left pressing member 105 bend the workpiece 10, with each of the one end portion of the unpressed region 10h adjacent to the fixing region 10f (first deformed portion 10p), and the other end portion of the unpressed region 10h adjacent to the pair of pressed regions 10g (second deformed portion 10q) as a boundary. Since the first deformed portion 10p is pushed down along the edge of the fixing region 10f, which is fixed and is not easily deformed, the first deformed portion is bent in a crest fold shape. Since the second deformed portion 10q is pressed against the supporting member 101, the second deformed portion is bent in a trough fold shape along the edges of the pair of pressed regions 10g, which are easily deformed. Therefore, the unpressed region 10h of the workpiece 10 is bent such that a crest fold shape and a trough fold shape are continuous from the other end 10b toward the side with the one end 10a.

The method for manufacturing a terminal member 11 according to the first embodiment described above provides actions and effects by means of the following configurations.

The method for manufacturing a terminal member 11 is used for manufacturing a terminal member 11 for electrical conduction with a conductive member (a winding 50) by working a workpiece (workpiece 10) which comprises a plate shape extending from one end 10a toward the other end 10b and provided with a first surface (a front surface 10c) and a second surface (a rear surface 10d), and which is provided, at the one end 10a, with a recessed portion 10e that is cut out and recessed from the front surface 10c to the rear surface 10d. In this method for manufacturing the terminal member 11, the recessed portion 10e is supported by being abutted against a supporting member 101, a portion (a fixing region 10f) spaced from the recessed portion 10e toward the side with the other end 10b is fixed, and both side portions (a pair of pressed regions 10g) along the one end 10a from the recessed portion 10e are bent while being pressed from the front surface 10c toward the side with the rear surface 10d, thereby forming, a pair of conductive surfaces (the first conductive surface 10d1 and the second conductive surface 10d2) for conduction with the winding 50, the rear surface 10d of the portions facing each other with the supporting member 101 interposed therebetween.

According to the method for manufacturing a terminal member 11 configured in this manner, a pair of conductive surfaces, a first conductive surface 10d1 and a second conductive surface 10d2, are formed by pressing a pair of pressed regions 10g of the workpiece 10 along the supporting member 101. That is, by using this method for manufacturing a terminal member 11, it is possible to form a pair of conductive surfaces, the first conductive surface 10d1 and the second conductive surface 10d2, which face each other, by means of a single pressing based on the supporting member 101. Therefore, this method for manufacturing a terminal member 11 is capable of greatly improving the productivity of the terminal member 11 to be joined to a winding 50 for electrical conduction therewith.

In addition, according to the method for manufacturing a terminal member 11 configured in this manner, it is possible to make the width of the portion (the supporting portion 11N) positioned on the side with the other end 11b and supporting the pair of conductive surfaces (the first conductive surface 11d1 and the second conductive surface 11d2) in the terminal member 11 to be manufactured to be thicker than the width of the portion (the conductive portion 11M) positioned on the side with the one end 11a and including the pair of conductive surfaces (the first conductive surface 11d1 and the second conductive surface 11d2). Therefore, this method for manufacturing a terminal member 11 is capable of providing great rigidity to the terminal member 11 to be manufactured. In particular, if the terminal member 11 to be manufactured is highly rigid, so that even when said terminal member interferes with other component members, misalignment does not readily occur; therefore, it is possible to maintain positional accuracy, and handling becomes easy.

Additionally, according to the method for manufacturing a terminal member 11 configured in this manner, the workpiece 10 to be used for working comprises a plate shape having only the recessed portion 10e on the one end 10a, and breaking and cutting are not performed when working the workpiece 10. That is, the yield of the workpiece 10 itself to be used for working is high, and material is not discarded during working of the workpiece 10. Therefore, the method for manufacturing a terminal member 11 is capable of reducing the material costs required for the workpiece 10.

Furthermore, in this method for manufacturing a terminal member 11, the pressing of the portions of the workpiece 10 to be bent, excludes the portion (the unpressed region 10h) facing the side with the other end 11b.

According to the method for manufacturing a terminal member 11 configured in this manner, the pair of pressed regions 10g are pressed toward the side with the rear surface 10d across the unpressed region 10h. With this configuration, it is possible to bend the unpressed region 10h adjacent to the pair of pressed regions 10g to be inclined from the side with faces the other end 11b adjacent to the fixing region 10f toward the side with the one end 10a spaced from the fixing region 10f, in a single pressing. That is, by using this method for manufacturing a terminal member 11, while the unpressed region 10h is deformed accompanying the bending of the adjacent pair of pressed regions 10g, the one end 10a side spaced from the fixing region 10f is more readily bent than the side with faces the other end 11b that is adjacent to the fixing region 10f, which is fixed and does not readily deform. Accordingly, the unpressed region 10h is relatively largely bent so as to be inclined from the side with faces the other end 11b toward the one end 10a side. As a result, it is possible to tilt and connect the space between the pair of pressed regions 10g and the fixing region 10f by the unpressed region 10h, which is inclined from the side with faces the other end 11b toward the side with the one end 10a. Therefore, this method for manufacturing a terminal member 11 is capable of imparting great rigidity to the entire terminal member 11 to be manufactured by the inclined portion (the unpressed region 10h) that is formed between the proximal end side (the side with the fixing region 10f) and the distal end side (the side with the pair of the pressed regions 10g).

Additionally, according to the method for manufacturing a terminal member 11 configured in this manner, it is possible to bend the workpiece 10, with each of the one end portion of the unpressed region 10h adjacent to the fixing region 10f (first deformed portion 10p), and the other end portion of the unpressed region 10h adjacent to the pair of pressed regions 10g (second deformed portion 10q) as a boundary, by a single pressing. With this configuration, it is possible to bend the first deformed portion 10p in a crest fold shape along the edge of the fixing region 10f and to bend the second deformed portion 10q in a trough fold shape along the edges of the pair of pressed regions 10g abutting the supporting member 101, as seen from the front surface 10c toward the rear surface 10d side of the workpiece 10. That is, by using this method for manufacturing a terminal member 11, it is possible to bend the first deformed portion 10p into a crest fold shape by pressing down along the edge of the fixing region 10f, which is fixed and is not easily deformed. At the same time, it is possible to bend the second deformed portion 10q in a trough fold shape along the edges of the pair of pressed regions 10g, which are easily deformed, by pressing against the supporting member 101.

Therefore, this method for manufacturing a terminal member 11 is capable of accurately forming the terminal member 11, which includes a pair of conductive surfaces, a first conductive surface 10*d*1 and a second conductive surface 10*d*2, while providing great overall rigidity to the terminal member 11 to be manufactured, by bending the unpressed region 10*h* of the workpiece 10 such that the crest fold shape and the trough fold shape are continuous from the other end 10*b* toward the one end 10*a* side. In particular, according to such a method for manufacturing a terminal member 11, since it is possible to suppress the occurrence of spring back by connecting a crest fold shape and a trough fold shape, it becomes possible to prevent the shape of the terminal member 11 from deforming after manufacture.

Furthermore, in this method for manufacturing a terminal member 11, the pressing of portions (the pair of the pressed regions 10*g*) of the workpiece 10 to be bent, which are spaced respectively from the supporting member 101 along both sides of the one end 10*a* by a distance equal to or greater than the thickness (h3) between the front surface 10*c* and the rear surface 10*d*.

According to the method for manufacturing a terminal member 11 configured in this manner, it is possible to form the thickness (h1) along the one end 10*a* of the distal end side that includes the first conductive surface 10*d*1 and the thickness (h2) along the one end 10*a* of the distal end side that includes the second conductive surface 10*d*2, to be respectively equal to or greater than the thickness (h3) between the front surface 10*c* and the rear surface 10*d* on the proximal end side. Therefore, this method for manufacturing a terminal member 11 is capable of providing to each of the distal end side portion, including the first conductive surface 11*d*1 and the distal end side portion including the second conductive surface 11*d*2 the same or greater rigidity than that of the proximal end side portion.

Modified Example of the First Embodiment

In the terminal member 12, a pair of conductive surfaces, a first conductive surface 12*d*1 and a second conductive surface 12*d*2, project in the opposite direction (upward) to the conductive portion 11M of the terminal member 11 described in the first embodiment.

The configuration of the terminal member 12 will be described with reference to FIG. 4.

Figure 4:
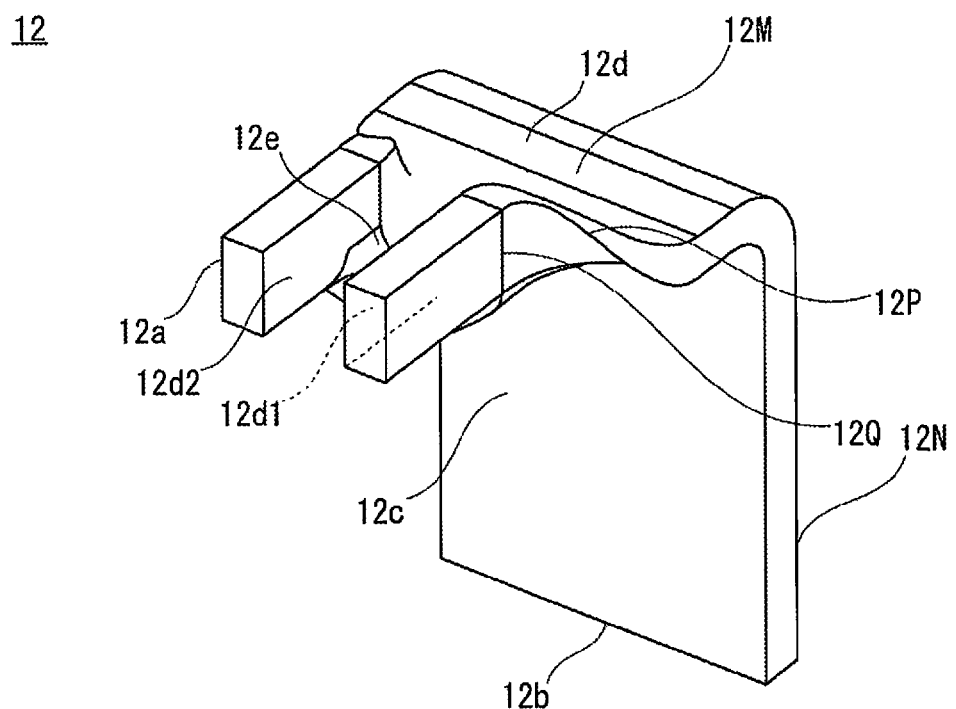
FIG. 4 is a perspective view illustrating a terminal member according to a modified example of the first embodiment.

FIG. 4 is a perspective view illustrating a terminal member 12 according to a modified example of the first embodiment.

The terminal member 12 is formed bent into an L shape from a supporting portion 12N to a conductive portion 12M, such that the front surface 12*c* side faces inward. With such a terminal member 12, in the same manner as the terminal member 11, a workpiece 10 is worked by a manufacturing device 100 to form a pair of conductive surfaces, a first conductive surface 12*d*1 and a second conductive surface 12*d*2. Thereafter, the terminal member 12 is formed by being bent into an L shape in the direction opposite to that of the terminal member 11, such that the front surface 12*c* side faces inward, bounded by the supporting portion 12N and the conductive portion 12M.

The terminal member 12 according to the modified example of the first embodiment provides actions and effects by means of the following configurations, in addition to the actions and effects of the terminal member 11 according to the first embodiment.

The terminal member 12 is formed bent into an L shape from the supporting portion 12N to the conductive portion 12M, such that the front surface 12*c* side faces inward.

The terminal member 12 configured in this manner comprises a pair of conductive surfaces, the first conductive surface 12*d*1 and the second conductive surface 12*d*2, on the outward side (outer side) of the L shaped bend. Therefore, with the terminal member 12, it is possible to avoid interference between the pair of conductive surfaces, the first conductive surface 12*d*1 and the second conductive surface 12*d*2, and a structure positioned on the inward side (inner side) of the terminal member 12 (for example, a main frame 212 of the manufacturing device 200 of the bus ring assembly 40 according to the third embodiment, described below).

Second Embodiment

The bus ring 20 is a wiring member that causes electric power supplied from the outside to flow through a plurality of windings 50.

The configuration of the bus ring 20 will be described with reference to FIG. 5 and FIG. 6.

Figure 5:
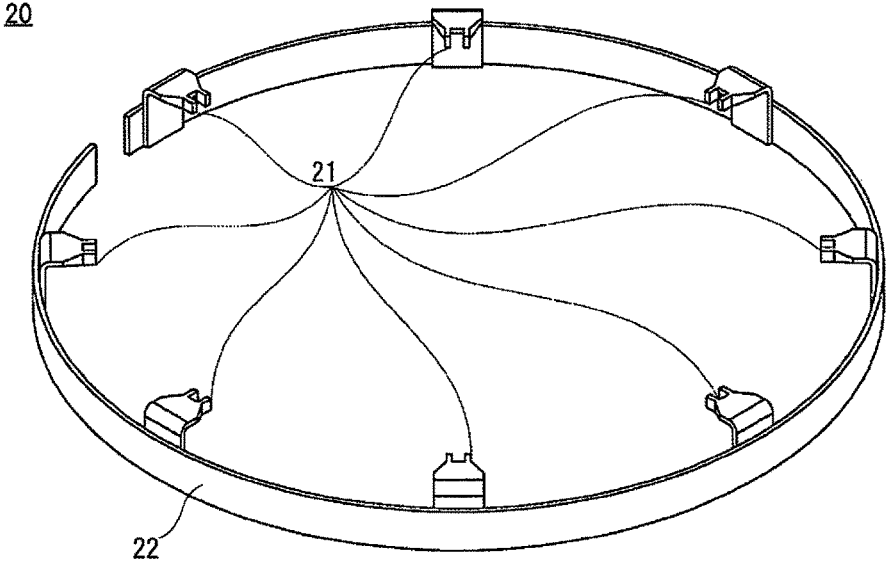
FIG. 5 is a perspective view illustrating a bus ring according to the second embodiment.
Figure 6:
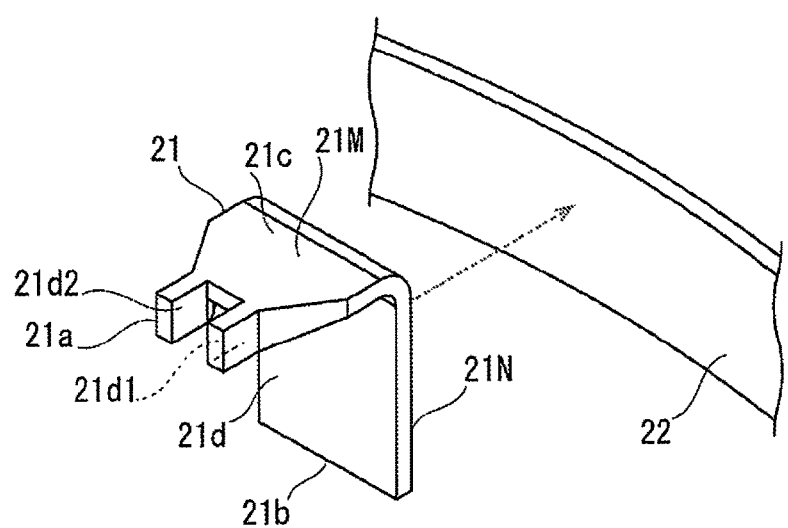
FIG. 6 is an exploded perspective view illustrating the main parts of the bus ring of FIG. 5.

FIG. 5 is a perspective view illustrating a bus ring 20 according to the second embodiment. FIG. 6 is an exploded perspective view illustrating the main parts of the bus ring 20 of FIG. 5.

The bus ring 20 comprises terminal members 21 and a conductive band member 22.

The terminal members 21 have the same configuration as the terminal member 11. The terminal members 21 are illustrated by simplifying the outer shape of the terminal member 11.

The conductive band member 22 conducts electric power supplied from the outside to each of the terminal members 21. The conductive band member 22 is made from a conductive metal, such as copper. The conductive band member 22 has an elongated shape and is curved into an arc shape. Both ends of the conductive band member 22 in the longitudinal direction are spaced. The conductive band member 22 joins a plurality of terminal members 21 to the inner perimeter surface along the longitudinal direction thereof at a predetermined interval. Each of the terminal members 21 is provided such that the distal end side of the conductive portion 21M thereof faces the radially inward direction of the conductive band member 22. The conductive band member 22 and the terminal members 21 are joined to each other by the application of ultrasonic waves to the abutting portions to generate vibrations and thus frictional heat, locally melting the abutting portions.

The bus ring 20 according to the second embodiment described above provides actions and effects by means of the following configurations.

The bus ring 20 comprises terminal members 21 and a conductive band member 22. Each terminal member 21 is provided with a conductive portion 21M comprising a pair of conductive surfaces, a first conductive surface 21*d*1 and a second conductive surface 21*d*2, having a plate shape extending from one end 21*a* toward the other end 21*b* and provided with a front surface 21*c* and a rear surface 21*d*, respectively projecting from the front surface 21*c* to the rear surface 21*d* side, and opposite each other along a direction that intersects the direction from the one end 21*a* toward the other end 21*b*, and with a supporting portion 21N extending from the conductive portion 21M toward the other end 21*b* side and supporting the conductive portion 21M, and the width of the supporting portion 21N along the direction in which the pair of conductive surfaces, the first conductive surface 21d1 and the second conductive surface 21d2, face each other is wider than that of the conductive portion 21M. The conductive band member 22 comprises an elongated shape, which joins a plurality of terminal members 21 along the longitudinal direction at predetermined intervals, and conducts electric power supplied from the outside to each of the terminal members 21.

With respect to the terminal member 21 of a bus ring 20 configured in this manner, the width of the supporting portion 21N is greater than the width of the conductive portion 21M. That is, since the terminal members 21 provided to the bus ring 20 are able to sufficiently support the conductive portion 21M that joins the winding 50 by means of the supporting portion 21N having a greater width than the conductive portion 21M, it is possible to increase the rigidity of the entire terminal. Therefore, even if stress is applied to the terminal members 21 or the conductive band member 22 at the time that the winding 50 is joined to the terminal members 21, or after the winding 50 is joined to the terminal members 21, the bus ring 20 is able to prevent the breakage thereof.

Modified Example of the Second Embodiment

The radial thickness of the bus ring 30 is formed to be less than that of the bus ring 20 described in the second embodiment.

The configuration of the bus ring 30 will be described with reference to FIG. 7 and FIG. 8.

Figure 7:
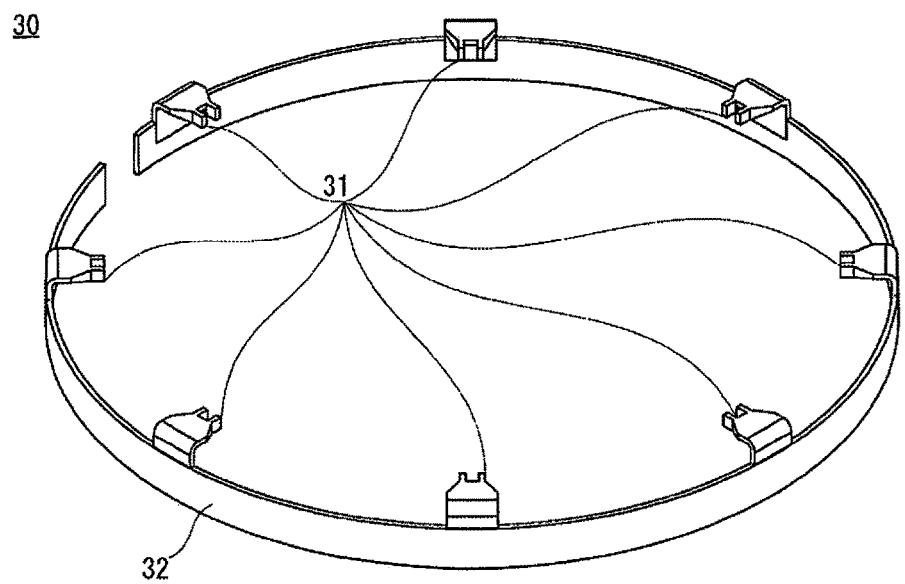
FIG. 7 is a perspective view illustrating a bus ring according to a modified example of the second embodiment.
Figure 8:
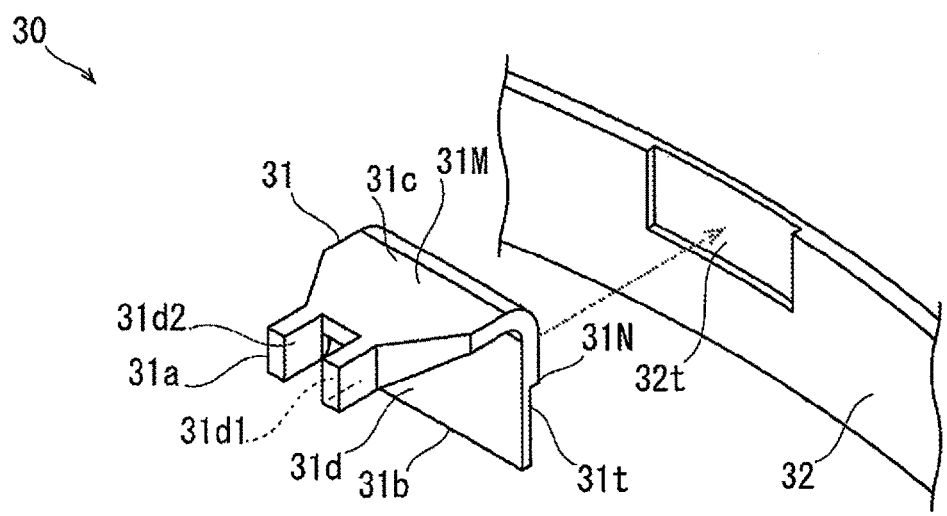
FIG. 8 is an exploded perspective view illustrating the main parts of the bus ring of FIG. 7.

FIG. 7 is a perspective view illustrating a bus ring 30 according to a modified example of the second embodiment. FIG. 8 is an exploded perspective view illustrating the main parts of the bus ring 30 of FIG. 7.

The bus ring 30 comprises terminal members 31 and a conductive band member 32.

Each terminal member 31 has the same specifications as the terminal member 21 except for the shape of the supporting portion 31N. The supporting portion 31N is formed such that the length thereof along the longitudinal direction (vertical direction illustrated in FIG. 7) is half the length along the longitudinal direction of the supporting portion 21N of the terminal member 21. In the supporting portion 31N, a joint portion 31t is formed by partially reducing the thickness of the front surface 31c side (radially outward side shown in FIG. 7) of the portion that is joined to the conductive band member 32. Since the joint portion 31t is formed by reducing the thickness of only the lower portion along the longitudinal direction of the supporting portion 31N (vertical direction shown in FIG. 7) and the thickness of the upper portion is not changed, the terminal member 31 maintains overall strength.

In the conductive band member 32, the joint portion 32t is formed by reducing the thickness of the portion that is joined to the terminal member 31. Since the joint portion 32t is formed by reducing the thickness of only the upper portion along the short side direction (vertical direction shown in FIG. 7) and the thickness of the lower portion is not changed, the conductive band member 32 maintains overall strength.

The bus ring 30 according to the modified example of the second embodiment described above provides actions and effects by means of the following configurations.

In the bus ring 30, the thickness of the joint portion 31t of the terminal member 31 that is joined to the conductive band member 32 is formed to be less than the thickness of the portion surrounding the joint portion 31t and/or the thickness of the joint portion 32t of the conductive band member 32 that is joined to the terminal member 31 is formed to be less than the thickness of the portion surrounding the joint portion 32t.

With reference to a bus ring 30 configured in this manner, when a plurality (for example, four: N phase, U phase, V phase, and W phase) of bus rings are stacked, it is possible to reduce the gaps between adjacent bus rings 30, compared with the gaps between adjacent bus rings 20. Therefore, the bus ring 30 is capable of improving the stacking efficiency when a plurality thereof is laminated.

The bus ring 30 is formed such that the sum of the thickness of the joint portion 31t of the terminal member 31 and the thickness of the joint portion 32t of the conductive band member 32 is equal to or less than the thickness of the portion around the joint portion 31t of the terminal member 31, and/or equal to or less than the thickness of the portion around the joint portion 32t of the conductive band member 32.

With reference to a bus ring 30 configured in this manner, when a plurality (for example, four: N phase, U phase, V phase, and W phase) of bus rings are stacked, it is possible to eliminate the gaps between adjacent bus rings 30. Therefore, the bus ring 30 is capable of maximizing the stacking efficiency when a plurality thereof is laminated.

Third Embodiment

The bus ring assembly 40 is a power distribution assembly that causes electric power supplied from the outside to flow through a plurality of windings 50 of the U phase, V phase, and N phase. The manufacturing device 200 can be used to easily manufacture the bus ring assembly 40.

First, the configuration of a bus ring assembly 40 manufactured using the manufacturing device 200 will be described with reference to FIGS. 9-11.

Figure 9:
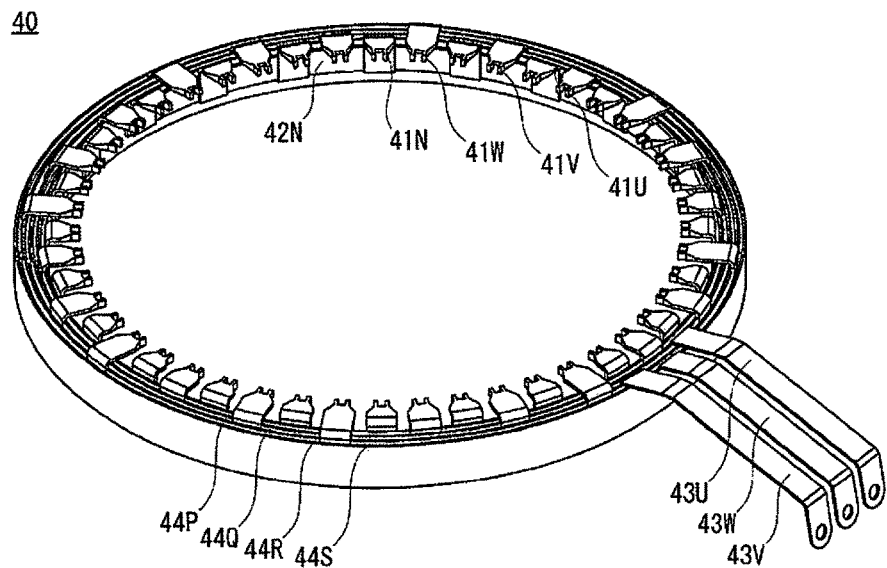
FIG. 9 is a perspective view illustrating a bus ring assembly according to a third embodiment.

FIG. 9 is a perspective view illustrating a bus ring assembly 40 according to the third embodiment. FIG. 10 is a top view illustrating the main parts of the bus ring assembly 40 of FIG. 9. FIG. 11 is a view illustrating the main part of the bus ring assembly 40 of FIG. 9, which is a portion thereof, in a state in which an insulating band member 44P and an insulating band member 44Q are bonded to both sides in the radial direction of a U-phase conductive band member 42U. FIG. 11A is a perspective view showing said main part. FIG. 11B is a side view showing said main part.

The bus ring assembly 40 comprises bus rings having terminal members 41 and conductive band members 42, high-voltage members 43 for supplying electric power from a three-phase AC power source to the conductive band members 42, and insulating band members 44 for insulating between adjacent bus rings.

The bus rings have terminal members 41 and conductive band members 42. The terminal members 41 have the same specifications as the terminal members 21. The conductive band members 42 have the same specifications as the conductive band member 22. The bus rings are configured from four phases: U phase, V phase, W phase, and N phase.

Figure 15:
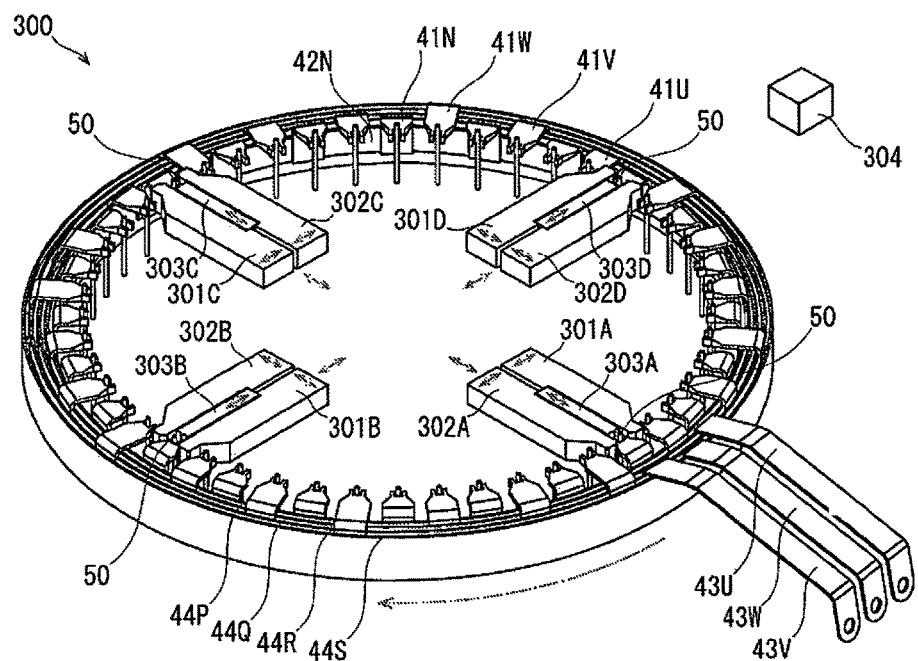
FIG. 15 is a perspective view of a connecting device of a winding and terminal members of the bus ring assembly according to the fourth embodiment.

The U-phase, V-phase, and W-phase bus rings supply electric power supplied from a three-phase AC power source to the winding 50, via the high-voltage members 43, the conductive band members 42, and the terminal members 41. Each terminal member 41 is connected to one end of the winding 50 (FIG. 15). The winding 50 is configured by being wound in a coil shape (not shown) with respect to an insulator that covers the slot portion of the stator of a stator assembly. The U-phase bus ring has terminal members 41U and conductive band members 42U. The V-phase bus ring has terminal members 41V and conductive band members 42V. The W-phase bus ring has terminal members 41W and conductive band members 42W.

The N-phase bus ring corresponds to ground for the U-phase, V-phase, and W-phase bus rings. The N-phase bus ring has terminal members 41N and conductive band members 42N. The N-phase bus ring connects the terminal member 41N to the other end of the winding 50.

Figure 10:
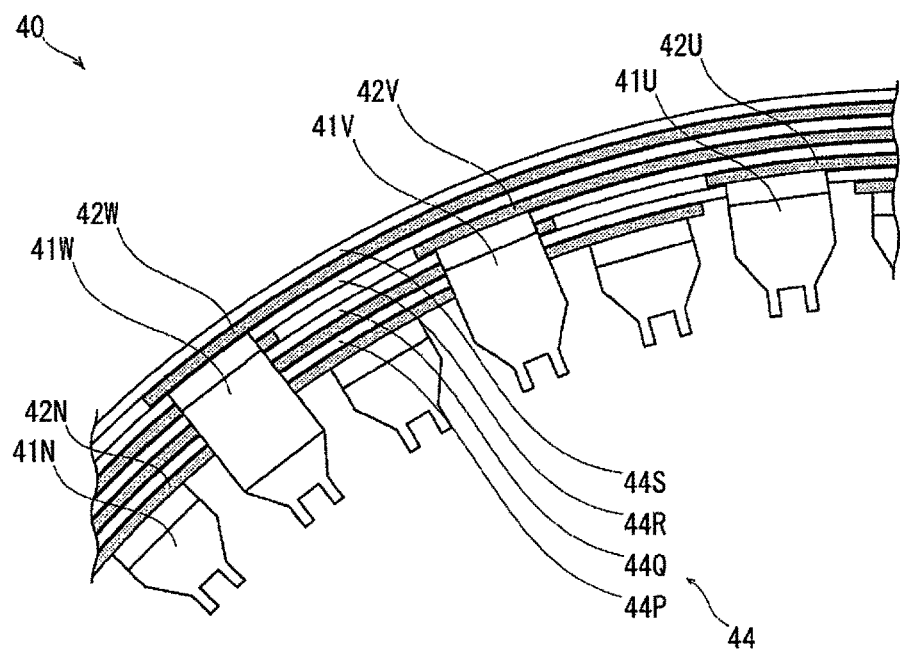
FIG. 10 is a top view illustrating the main parts of the bus ring assembly of FIG. 9.
Figure 11A:
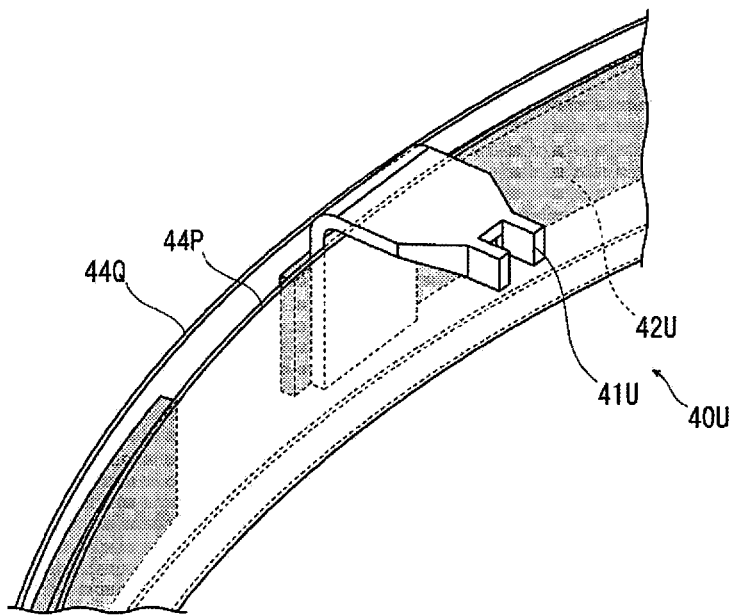
FIG. 11A is a perspective view of the main part of the bus ring assembly of FIG. 9, which is a portion thereof, in a state in which insulating band members are bonded to both sides in the radial direction of a U-phase conductive band member.
Figure 11B:
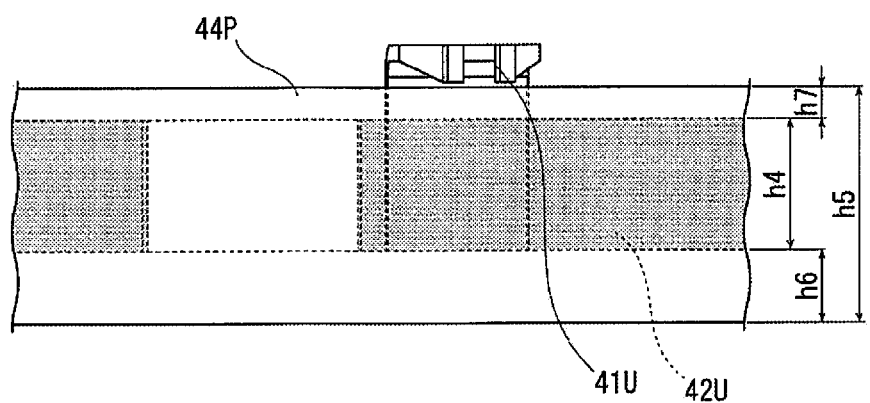
FIG. 11B is a side elevational view of the main part of the bus ring assembly of FIG. 11A.

The bus rings are wound radially outwardly in the order of N phase, U phase, V phase, and W phase, as illustrated in FIG. 10. Therefore, the terminal members 41 are configured such that the length along the radial direction of the conductive portion becomes longer in the order of terminal members 41N, 41U, 41V, and 41W. With such a configuration, the positions of the pairs of conductive surfaces of the respective terminal members 41 are arranged concentrically.

The high-voltage members 43 supply electric power from a three-phase AC power source to the conductive band members 42. The high-voltage members 43 are formed in an elongated shape, and the proximal end sides thereof are joined to the upper ends of the conductive band members 42 shown in FIG. 9. The high-voltage members 43 are extended so as to project radially outwardly from the conductive band members 42. A plurality of locations of the high-voltage members 43 from the proximal end side to the distal end side are bent downward in FIG. 9. Wires of the three-phase AC power source are connected via through-holes formed on the distal end sides of the high-voltage members 43. The U-phase, V-phase, and W-phase high-voltage members 43U, 43V, and 43W are ultrasonically joined to the conductive band members 42U, 42V, and 42W, respectively, as illustrated in FIG. 9.

The insulating band members 44 provide insulation between adjacent bus rings. The insulating band members 44 are made from an insulating material, for example, and are formed in an elongated shape. The insulating band members 44 are not made from molding resin or the like, and thus can be configured with a thickness of several tens of µm. The short side direction width of the insulating band members 44 is longer than that of the insulating band member 42. With respect to the short side direction thickness h4 of the conductive band member 42, the insulating band member 44 has a thickness h5 that is extended downward by a thickness h6 and extended upward by a thickness h7, as illustrated in FIG. 11B. An insulating band member 44P is laminated between the conductive band members 42N and 42U, as illustrated in FIG. 10. Similarly, an insulating band member 44Q is laminated between the conductive band members 42U and 42V, an insulating band member 44R is laminated between the conductive band members 42V and 42W, and an insulating band member 44S is laminated radially outwardly with respect to the conductive band member 42W.

The insulating band members 44P, 44Q, and 44R are provided with adhesive members on the radially inner sides and outer sides. The adhesive member is, for example, a silicone-based adhesive and is applied on both surfaces of the insulating band members 44. That is, the insulating band members 44P, 44Q, and 44R are configured like a double-sided adhesive tape having insulating properties. The insulating band member 44S is provided with an adhesive member on the radially inner side. The adhesive member is, for example, a silicone-based adhesive and is applied on one surface of the insulating band member 44S. That is, the insulating band member 44S is configured like a single-sided adhesive tape having insulating properties.

Next, the method of manufacturing the bus ring assembly 40 using the manufacturing device 200 as well as the manufacturing device 200 will be described with reference to FIG. 12 to FIG. 14.

Figure 12:
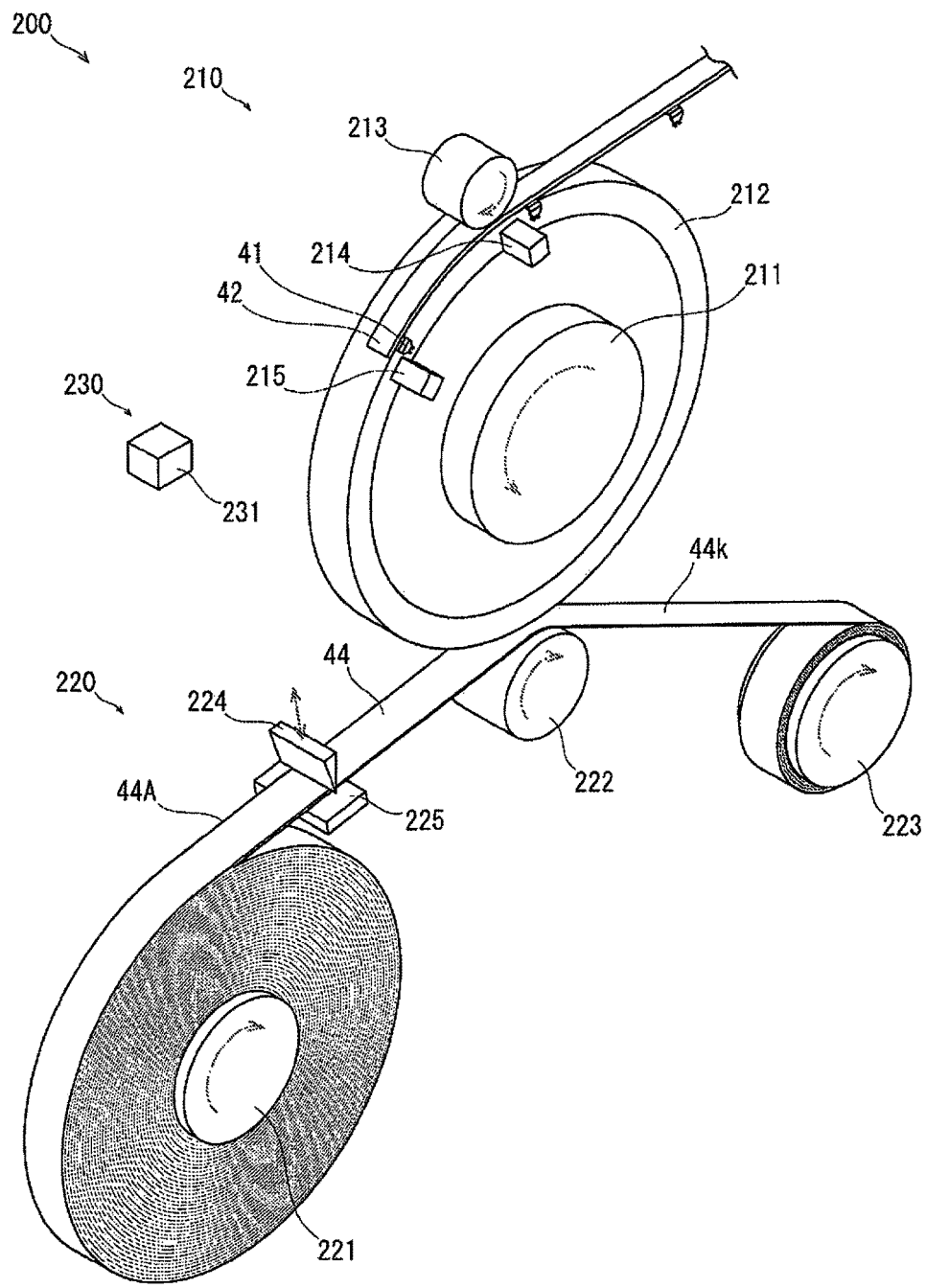
FIG. 12 is a perspective view illustrating a manufacturing device of the bus ring assembly according to a third embodiment.
Figure 13A:
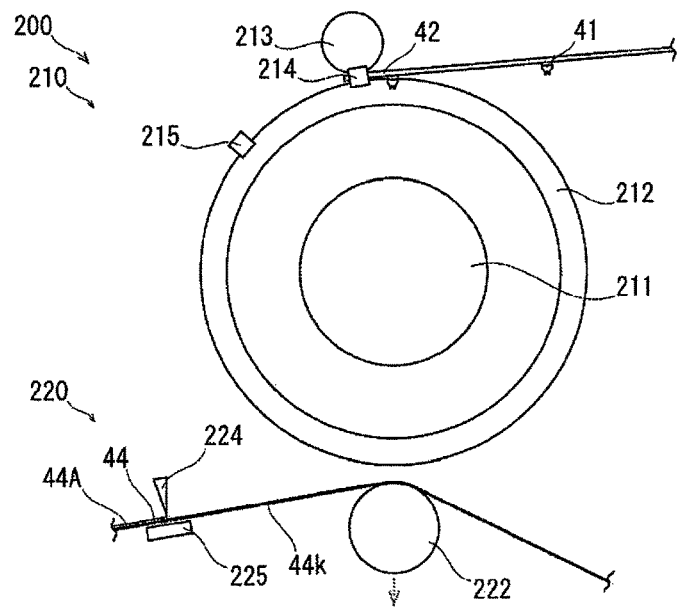
FIG. 13A is a side elevational view of a manufacturing device of the bus ring assembly illustrating a conductive band member to be wound around the main frame by the manufacturing device of FIG. 12 in the state before winding.
Figure 13B:
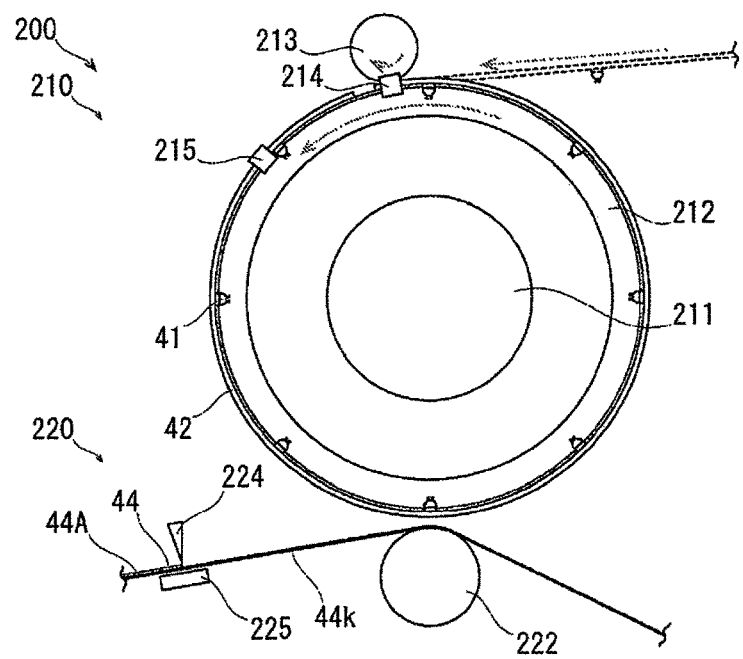
FIG. 13B is a side elevational view showing the state after winding.
Figure 14A:
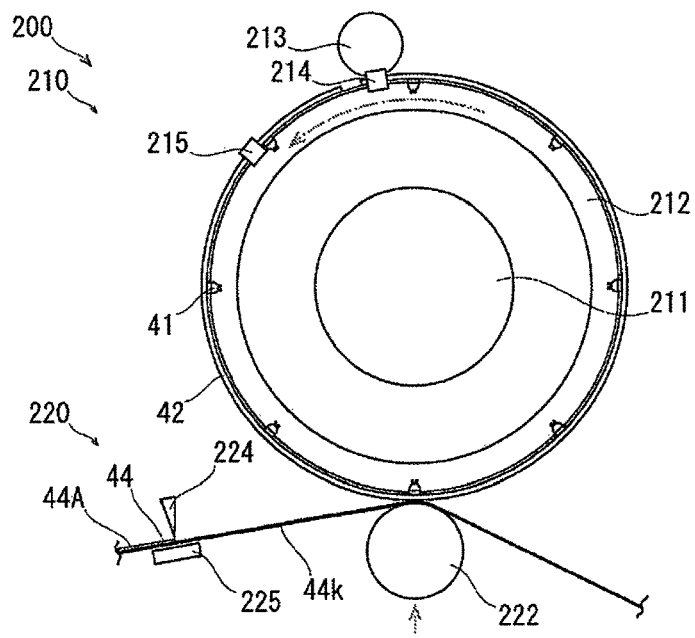
FIG. 14A is a side elevational view of a manufacturing device of the bus ring assembly illustrating an insulating band member to be wound around and bonded to a conductive band member in the state before winding.
Figure 14B:
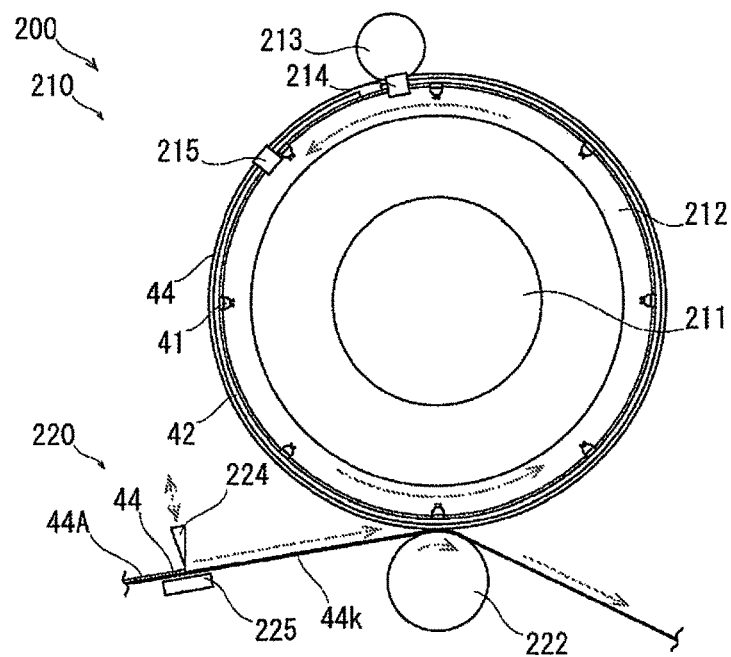
FIG. 14B is a side elevational view of the manufacturing device of the bus ring assembly illustrated in FIG. 14A illustrating the state after winding.

FIG. 12 is a perspective view illustrating a manufacturing device 200 of the bus ring assembly 40 according to the third embodiment. FIG. 13 is a view illustrating a state in which a conductive band member 42 is wound around the main frame 212 by the manufacturing device 200 of FIG. 12. FIG. 13A is a side view illustrating the state before winding. FIG. 13B is a side view showing the state after winding. Following FIG. 13, FIG. 14 is a view illustrating a state in which an insulating band member 44 is wound around and bonded to the conductive band member 42. FIG. 14A is a side view illustrating the state before winding. FIG. 14B is a side view showing the state after winding.

The method for manufacturing the bus ring assembly 40 is a method in which conductive band members 42 and insulating band members 44 are alternately wound and laminated along the longitudinal direction. The manufacturing device 200 is a device that embodies the method for manufacturing the bus ring assembly 40 described above.

The configuration of the manufacturing device 200 for manufacturing the bus ring assembly 40 will now be described.

The manufacturing device 200 comprises a first winding unit 210 that winds the conductive band member 42 joined with the terminal members 41 into an arc shape, a second winding unit 220 that winds the insulating band member 44 into an arc shape, and a control unit 230 that controls the operations of the first winding unit 210 and the second winding unit 220, as illustrated in FIG. 12.

The first winding unit 210 winds the conductive band member 42 joined with the terminal members 41 into an arc shape. The first winding unit 210 comprises a rotating roller 211 used for winding the conductive band member 42, a main frame 212, onto which the conductive band member 42 is wound, a pressing roller 213 that presses the conductive band member 42 against the main frame 212, a position sensor 214 that detects the positions of the terminal members 41 that are joined to the conductive band member 42 and the position of the distal end of the conductive band member 42, and a rotation sensor 215 that detects the winding length of the conductive band member 42.

The rotating roller 211 is formed in a cylindrical shape. The rotating roller 211 is provided with a rotating mechanism and rotates the main frame 212 attached to the outer perimeter surface.

The main frame 212 is formed in a cylindrical shape. The outer diameter of the main frame 212 is set to be the same as the designed inner diameter of the N-phase conductive band member 42N after being wound. The main frame 212 is configured to be detachable from the rotating roller 211. The main frame 212 causes the conductive band material 42 to be wound around the outer perimeter surface thereof.

The pressing roller 213 is formed in a cylindrical shape. The pressing roller 213 is disposed in proximity to the main frame 212 and is configured to be freely rotatable. The pressing roller 213 is rotated following the main frame 212 in a state of pressing the conductive band member 42 that is wound around the main frame 212.

The position sensor 214 detects the positions of the terminal members 41 that are joined to the conductive band member 42 and the position of the distal end of the conductive band member 42 that is wound onto the main frame 212. The position sensor 214 is disposed in a portion where the main frame 212 and the pressing roller 213 face each other, so as to face the outer perimeter edge of the side surface of the main frame 212. The position sensor 214 detects the positions of the terminal members 41 that are joined to the conductive band member 42 and the position of the distal end of the conductive band member 42 by, for example, irradiating laser light onto the winding path of the conductive band member 42 and receiving the light reflected from the distal end of the conductive band member 42. The position sensor 214 may also detect the positions of the terminal members 41 that are joined to the conductive band member 42 and the position of the distal end of the conductive band member 42 by image recognition using a camera. The position sensor 214 transmits the detected data to the control unit 230. The transmitted detected data are used for controlling the rotating roller 211.

The rotation sensor 215 detects the winding length of the conductive band member 42 that is wound around the main frame 212. The rotation sensor 215 is disposed on the downstream side of the position sensor 214 in the transport direction of the conductive band member 42, so as to face the outer perimeter edge of the side surface of the main frame 212. For example, the rotation sensor 215 measures the rotation angle of the main frame 212 and detects the winding length of the conductive band member 42 along the radial direction from the outer diameter and the rotation angle of the main frame 212. The rotation sensor 215 transmits the detected data to the control unit 230. The transmitted detected data are used for controlling the rotating roller 211.

The second winding unit 220 winds the insulating band member 44 in an arc shape. The second winding unit 220 comprises a supply roller 221 that supplies an insulating sheet 44A, a biasing roller 222 that biases the insulating band member 44 to the conductive band member 42 that is wound around the main frame 212, a winding roller 223 that winds a separator 44k while the insulating sheet 44A is pulled from the supply roller 221, a cutting blade 224 that cuts only the insulating band member 44 while leaving the separator 44k of the insulating sheet 44A, and a support table 225 that supports the separator 44k of the insulating sheet 44A that is pressed by the cutting blade 224.

The supply roller 221 is formed in a cylindrical shape, and an insulating sheet 44A is wound thereon. Here, the insulating sheet 44A is configured by providing an insulating band member 44 on one side of a film-like separator 44k made of, for example, polyethylene terephthalate. The supply roller 221 winds the insulating sheet 44A such that the insulating band member 44 is on the radially outward side and the separator 44k is on the radially inward side. The supply roller 221 is rotated following the winding roller 223 and supplies the insulating sheet 44A toward the main frame 212.

The biasing roller 222 is formed in a cylindrical shape. The biasing roller 222 is disposed in proximity to the main frame 212 and is configured to be freely rotatable. The biasing roller 222 biases, while applying tension to, the insulating band member 44 abutting the conductive band member 42, and is rotated following the main frame 212 and the winding roller 223.

The winding roller 223 is formed in a cylindrical shape. The winding roller 223 is provided with a rotating mechanism and winds and collects only the separator 44k while the insulating sheet 44A is pulled from the supply roller 221.

The cutting blade 224 is provided with a sharp linear blade at the distal end thereof. The cutting blade 224 is disposed between the supply roller 221 and the biasing roller 222. The cutting blade 224 is positioned to face the separator 44k side, along the short side direction of the insulating sheet 44A. The cutting blade 224 cuts only the separator 44k linearly.

The support table 225 is formed in a plate shape. The support table 225 is disposed opposing the cutting blade 224 across the insulating sheet 44A. The cutting blade 224 supports the separator 44k of the insulating sheet 44A that is pressed by the cutting blade 224.

The control unit 230 controls the operations of the first winding unit 210 and the second winding unit 220. The control unit 230 comprises a controller 231 that controls the operations of the rotating roller 211, the position sensor 214, the rotation sensor 215, the winding roller 223, and the cutting blade 224.

The controller 231 comprises a ROM, a CPU, and a RAM. A control program related to the winding of the conductive band member 42 and the insulating band member 44 is stored in the ROM (Read Only Memory). The control program contains information related to the operations of the rotating roller 211, the position sensor 214, the rotation sensor 215, the winding roller 223, and the cutting blade 224. The CPU (Central Processing Unit) of the controller 231 controls the operations of each of the component members described above. Various data related to each component member under control are temporarily stored in the RAM (Random Access Memory).

The method for manufacturing the bus ring assembly 40 using the manufacturing device 200 will now be described.

With respect to the conductive band member 42, the first winding unit 210 winds the conductive band member 42 joined to the terminal members 41 into an arc shape, under the control of the control unit 230, as illustrated in FIG. 13. FIG. 13A shows the state before the conductive band member 42 is wound around the main frame 212. FIG. 13B shows the state after the conductive band member 42 is wound around the main frame 212. The rotating roller 211 rotates the main frame 212 attached to the outer perimeter surface. Accompanying the rotation of the rotating roller 211, the main frame 212 presses, while bending, the supplied conductive band member 42 against the pressing roller 213, and winds the conductive band member around the outer perimeter surface thereof.

With respect to the insulating band member 44, the second winding unit 220 winds the insulating band member 44 into an arc shape while bonding the insulating band member to the conductive band member 42, under the control of the control unit 230, as illustrated in FIG. 14. FIG. 14A shows the state before winding the insulating band member 44 around the conductive band member 42. FIG. 14B shows the state after winding the insulating band member 44 around the conductive band member 42. The supply roller 221 is rotated following the winding roller 223 and supplies the insulating sheet 44A in a direction toward the conductive band member 42 that is wound around the main frame 212. The cutting blade 224 cuts only the insulating band member 44 along the short side direction of the insulating sheet 44A, at a predetermined interval with respect to the longitudinal direction. The biasing roller 222 is rotated following the winding roller 223 while biasing the insulating band member 44 against the conductive band member 42, such that the conductive band member 42 and the insulating band member 44 are brought in close contact and bonded. The winding roller 223 winds and collects the separator 44k.

The manufacturing device 200 is configured such that, before each component member of the bus ring assembly 40 is wound and laminated, a double-sided tape is affixed to the outer perimeter surface of the main frame 212, so that the main frame 212 and the conductive band member 42N can be temporarily fixed and so that the conductive band member 42N positioned on the radially innermost side is not detached from the main frame 212. The double-sided tape is peeled off of the main frame 212 and the conductive band member 42N after manufacturing the bus ring assembly 40.

The manufacturing device 200 laminates, while alternately winding with respect to the main frame 212, conductive band members 42 and insulating band members 44 in the order of N phase, U phase, V phase, and W phase. Specifically, the manufacturing device 200 repeats the steps shown in FIG. 13 and FIG. 14 and winds and laminates the conductive band member 42N, the insulating band member 44P, the conductive band member 42U, the insulating band member 44Q, the conductive band member 42V, the insulating band member 44R, the conductive band member 42W, and the insulating band member 44S, in that order, to manufacture the bus ring assembly 40.

The manufacturing device 200 adjusts the relative position of the conductive band member 42 to be wound around the main frame 212 during the manufacturing of the bus ring assembly 40 by a position sensor 214 or the like. That is, the rotating roller 211 winds, while rotating, each of the conductive band members 42 around the main frame 212, such that the terminal members 41N, 41U, 41V and 41W, which are respectively joined to the conductive band members 42N, 42U, 42V, and 42W, are evenly arranged in an arc shape along the radial direction, based on detected data obtained from the position sensor 214 and the like.

In the manufactured bus ring assembly 40, the insulating band member 44P, the insulating band member 44Q, and the insulating band member 44R are respectively joined to radially adjacent conductive band members 42 by adhesive members applied to both surfaces thereof. In the same manner, in the manufactured bus ring assembly 40, the insulating band member 44S is joined to the conductive band member 42W by an adhesive member applied to one surface thereof, while preventing a short circuit with another member positioned in the radially outward direction.

The manufactured bus ring assembly 40 is completed by bending a plurality of locations from the proximal end side to the distal end side of the high-voltage members 43U, 43V, and 43W, in a state of being detached from the manufacturing device 200 or in a state of being attached to the manufacturing device 200. The high-voltage members 43U, 43V, and 43W are joined to the conductive band members 42U, 42V, and 42W, as illustrated in FIG. 9.

The method for manufacturing a bus ring assembly 40 according to the third embodiment described above provides actions and effects by means of the following configurations.

In the method for manufacturing the bus ring assembly 40, conductive band members 42 having an elongated shape, comprising a plurality of terminal members 41 that are joined with a winding 50 and that cause electric power supplied from the outside to flow through each of the terminal members 41, and insulating band members 44 having an elongated shape and provided with insulating properties are alternately wound and laminated along the longitudinal direction.

According to the method for manufacturing a bus ring assembly 40 configured in this manner, the bus ring assembly 40 can be easily manufactured by an extremely simple method of alternately winding conductive band members 42 and insulating band member 44 along the longitudinal direction.

In particular, according to this manufacturing method, it is not necessary to prepare a plurality of metal molds in accordance with the sizes of the stator (stator) and the rotor (rotor) that configure a motor together with the bus ring assembly 40. Therefore, it is possible to manufacture bus ring assemblies 40 of various sizes at low cost, regardless of the size of the stator (stator) and of the rotor (rotor).

In addition, particularly according to such a manufacturing method, low-cost insulating band members 44 for insulation are used for insulation between adjacent conductive band members 42 (for example, the conductive band member 42 for the N phase and the conductive band member 42 for the U phase) instead of a high-cost insulating resin case. Additionally, high-cost automated facilities or skilled workers for embedding the component members into the resin case are not required. Therefore, it is possible to manufacture the bus ring assembly 40 at low cost. Moreover, it is possible to reduce the space required for a resin case. For example, the insulating band members 44, taking the place of a resin case, can be configured with a thickness of several tens of µm. Therefore, the bus ring assembly 40 can be reduced in size.

Furthermore, in this method for manufacturing the bus ring assembly 40, conductive band members 42 and insulating band members 44 are alternately wound and laminated with respect to a wound member (main frame 212).

According to the method for manufacturing the bus ring assembly 40 configured in this manner, since conductive band members 42 and insulating band members 44 are alternately wound so as to extend along the outer surface of the main frame 212, it is possible to form the bus ring assembly 40 with high precision. In addition, it is possible to form bus ring assemblies 40 of various shapes by simply changing the outer shape of the main frame 212. Furthermore, compared with the case in which an insulating resin case is used for insulation between adjacent conductive band members 42, a high-cost automated facility or the like for embedding component members in the resin case is not required, and the assembly of the bus ring assembly 40 can be carried out by a small-scale facility. In particular, when such a method for manufacturing a bus ring assembly 40 is implemented, there are few moving parts, as shown in the manufacturing device 200, and manufacturing can be carried out in a small space.

Furthermore, in this method for manufacturing the bus ring assembly 40, insulating band members 44 provided with adhesive members are joined and laminated to conductive band members 42.

According to the method for manufacturing a bus ring assembly 40 configured in this manner, since the conductive band members 42 and the insulating band members 44 are alternately wound and joined, it is possible to easily integrate the bus ring assembly 40. In particular, by configuring a thin adhesive member, it is possible to improve the laminating efficiency of the conductive band members 42 and the insulating band members 44. For example, it is possible to bond the conductive band members 42 and the insulating band members 44 using an adhesive having a layer thickness of several tens of µm.

Furthermore, in this method for manufacturing the bus ring assembly 40, the insulating band member 44, which has a short side direction width that is longer than the short side direction width of the conductive band member 42, is extended past both ends of the conductive band member 42 in the short side direction, while being laminated on the conductive band member 42.

According to the method for manufacturing a bus ring assembly 40 configured in this manner, it is possible to configure a motor using the bus ring assembly 40 and to prevent the occurrence of electric discharge between adjacent conductive band members 42 (for example, the N-phase conductive band member 42N and the U-phase conductive band member 42U), when the terminal members 41 electrically conduct from the high-voltage members 43 via the conductive band members 42. That is, an electric discharge does not occur unless, for example, in the space between the short side direction end of the N-phase conductive band member 42N and the short side direction end of the U-phase conductive band member 42U, the insulating band member 44 extending in the short side direction from those ends is bypassed. Therefore, according to the method for manufacturing a bus ring assembly 40 configured in this manner, it is possible to sufficiently suppress the occurrence of electric discharge in the bus ring assembly 40 after manufacture. Furthermore, according to the method for manufacturing a bus ring assembly 40 configured in this manner, it is possible to freely set the length of the insulating band members 44 that extend from both ends of the conductive band members 42 in the short side direction, according to the value of the voltage and the current conducted to the conductive band members 42.

Fourth Embodiment

The method for connecting the winding 50 and the terminal members 41 of the bus ring assembly 40 is used to form strong connections between the winding 50 and terminal members 41 comprising a pair of conductive surfaces, a first conductive surface 41$d$1 and a second conductive surface 41$d$2. The connecting device 300 is a device that embodies the method for connecting the winding 50 and the terminal members 41 described above.

Figure 16:
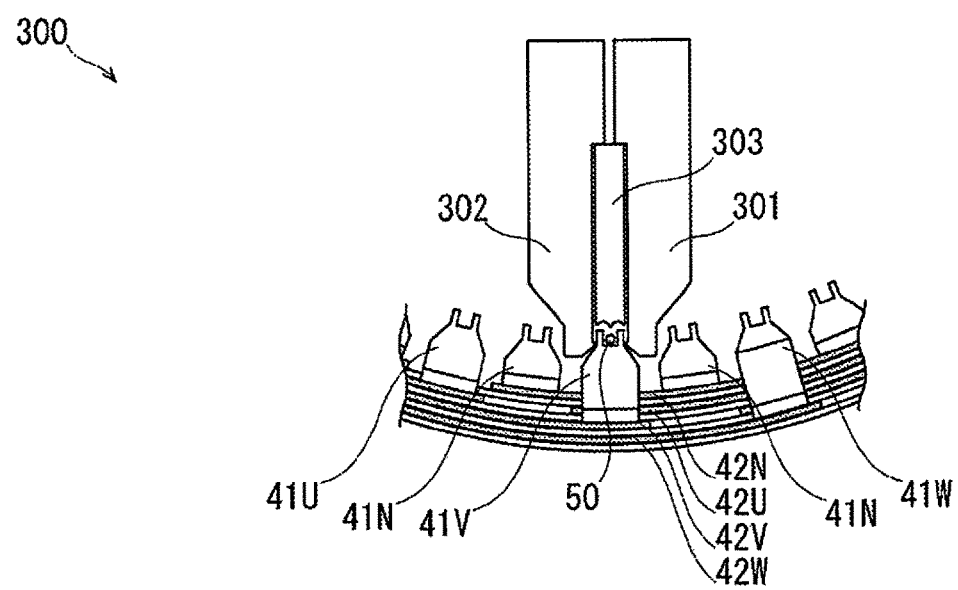
FIG. 16 is a partial top view of the connecting device of the winding with the terminal members of the bus ring assembly illustrating the main part of FIG. 15.
Figure 17A:
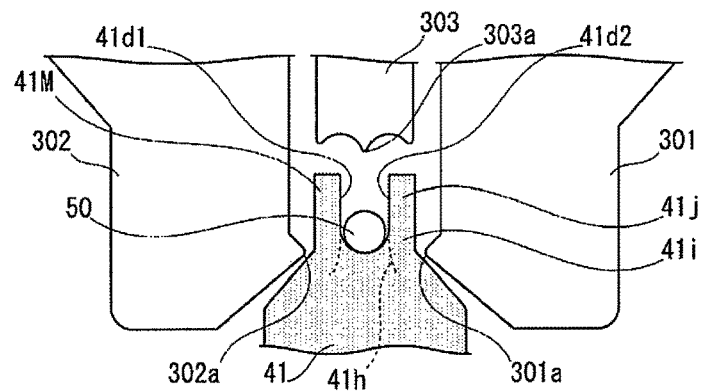
FIG. 17A is a partial top view of the terminal member and the winding illustrating the state before caulking of the terminal member of the bus ring assembly with respect to the winding.
Figure 17B:
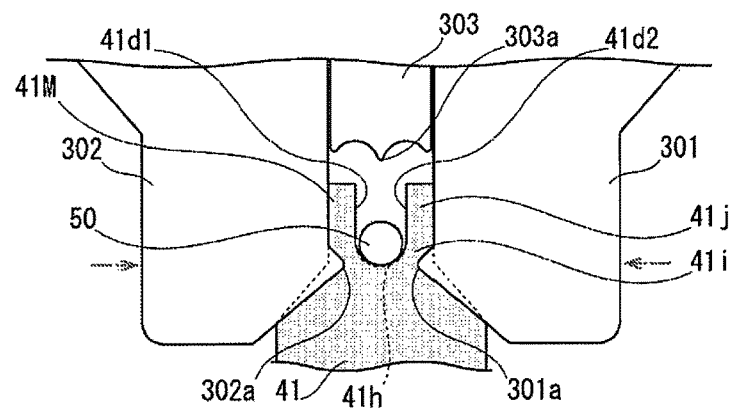
FIG. 17B is a partial top view of the terminal member and the winding illustrating the state in which a proximal end portion of the terminal member is caulked and connected with respect to the winding.
Figure 17C:
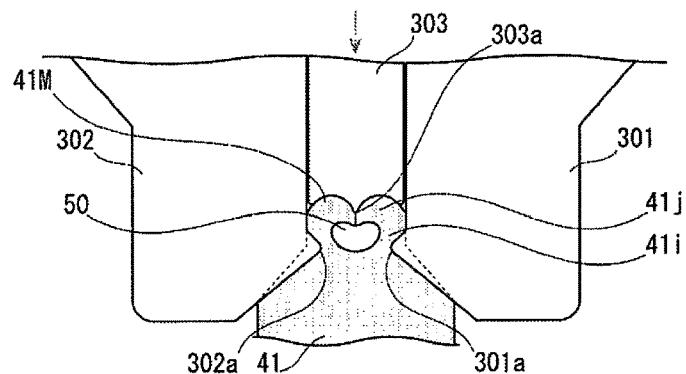
FIG. 17C is a partial top view of the terminal member and the winding illustrating the state in which a distal end portion of the terminal member is caulked and connected with respect to the winding.

FIG. 15 is a perspective view illustrating a connecting device 300 of a winding 50 and terminal members 41 of the bus ring assembly 40 according to the fourth embodiment. FIG. 16 is a top view illustrating the main part of FIG. 15. FIG. 17 is a view illustrating the main part of a connecting step using the connecting device 300 illustrated in FIG. 15 and FIG. 16. FIG. 17A is a top view illustrating the state before the terminal member 41 of the bus ring assembly 40 is caulked to the winding 50. Following FIG. 17A, FIG. 17B is a top view illustrating the state in which a proximal end portion 41*i* of the terminal member 41 is caulked and connected with respect to the winding 50. Following FIG. 17B, FIG. 17C is a top view illustrating the state in which a distal end portion 41*j* of the terminal member 41 is caulked and connected with respect to the winding 50.

First, the configuration of the connecting device 300 that connects the winding 50 and the terminal members 41 will be described.

The connecting device 300 comprises pairs of pressing members, right pressing members 301 and left pressing members 302, which press the proximal end portion 41*i* of the conductive portion 41M from both sides against the winding 50, distal end pressing members 303 that press and deforms the distal end portion 41*j* of the conductive portion 41M against the winding 50, and a controller 304 that respectively controls the operations of the right pressing members 301, the left pressing members 302, and the distal end pressing members 303, as illustrated in FIG. 15.

The two pressing members, the right pressing member 301 and the left pressing member 302, are each formed in a rectangular parallelepiped shape and are configured to be capable of approaching and separating from each other in the lateral direction of FIG. 16 by a linear moving stage. The right pressing member 301 comprises a right pressing portion 301*a* that protrudes in a convex shape on the side surface of the distal end portion thereof, as illustrated in FIG. 17. Similarly, the left pressing member 302 comprises a left pressing portion 302*a* that protrudes in a convex shape on the side surface of the distal end portion thereof, as illustrated in FIG. 17. The right pressing portion 301*a* and the left pressing portion 302*a* have the same shape and are opposite each other. Four pairs of the right pressing member 301 and the left pressing member 302 are arranged in an arc shape at equiangular (90°) intervals, such that the distal end portions comprising the right pressing portions 301*a* and the left pressing portions 302*a* face radially outwardly, as illustrated in FIG. 15.

The four pairs of the right pressing member 301 and the left pressing member 302 are respectively operated in conjunction with each other and respectively connect four terminal members 41 to the winding 50 at the same time. The four pairs of the right pressing member 301 and the left pressing member 302 are brought close to each other so that the proximal end portions 41*i* of the four terminal members 41 facing radially outwardly are connected to the winding 50 and are then rotated in the circumferential direction in FIG. 15 after being retracted radially inwardly by the linear moving stage. Thereafter, the four pairs of the right pressing member 301 and the left pressing member 302 are returned radially outwardly by the linear moving stage by the original distance, and respectively connect the proximal end portions 41*i* of four unconnected terminal members 41 to a new winding 50.

The distal end pressing members 303 are formed in a rod shape and are configured to be movable with respect to the vertical direction in FIG. 16. The distal end pressing members 303 are disposed in the gaps between the pairs of pressing members, the right pressing member 301 and the left pressing member 302. Even when the pair of pressing members, the right pressing member 301 and the left pressing member 302, come closest to each other, the distal end pressing member 303 does not interfere with the side surfaces thereof, as illustrated in FIG. 17B. The distal end pressing member 303 is provided with a distal end pressing portion 303*a* having two side-by-side concave depressions formed at the distal end portion thereof, as illustrated in FIG. 17. Four sets of the distal end pressing members 303 are arranged in an arc shape at equiangular (90°) intervals, such that the distal end portions comprising the distal end pressing portion 303*a* face radially outwardly, together with the pair of pressing members, the right pressing member 301 and the left pressing member 302, as illustrated in FIG. 15.

The four sets of distal end pressing members 303 connect the distal end portions 41*j* of the four terminal members 41 facing radially outwardly with respect to the winding 50 and are then rotated in the circumferential direction in FIG. 15 after being retracted radially inwardly by the linear moving stage, together with the pair of pressing members, the right pressing member 301 and the left pressing member 302. Thereafter, the four sets of the distal end pressing members 303 are returned radially outwardly by the linear moving stage by the original distance together with the pair of pressing members, the right pressing member 301 and the left pressing member 302, and respectively connect the distal end portions 41*j* of four unconnected terminal members 41 to a new winding 50.

The controller 304 respectively controls the operations of the right pressing members 301, the left pressing members 302, and the distal end pressing members 303. The controller 304 comprises a ROM, a CPU, and a RAM. A control program related to the operations of the right pressing members 301, the left pressing members 302, and the distal end pressing members 303 is stored in the ROM (Read Only Memory). The CPU (Central Processing Unit) of the controller 304 controls the operations of each of the component members described above. Various data related to each component member under control are temporarily stored in the RAM (Random Access Memory).

Next, the method for connecting the terminal member 41 and the winding 50 using the connecting device 300 will be described.

The connecting device 300 starts the connection of a terminal member 41 and a winding 50 in a state in which the winding 50 is positioned between a pair of conductive surfaces, the first conductive surface 41d1 and the second conductive surface 41d2, of the terminal member 41, as illustrated in FIG. 17A.

The connecting device 300 brings the right pressing portion 301a and the left pressing portion 302a close to each other to thereby press and restrain the proximal end portion 41i of the terminal member 41 toward the center from the left and right in the drawing, while deforming and pressure bonding the proximal end portion 41i to the winding 50, as illustrated in FIG. 17B. The proximal end portion 41i includes the pair of conductive surfaces, the first conductive surface 41d1 and the second conductive surface 41d2, and faces the other end 41b side. Here, the connecting device 300 presses and deforms a spaced portion 41h toward the center from the left and right in the drawing, so as to enfold the spaced portion 41h in the deformation of the proximal end portion 41i, and pressure bonds the spaced portion to the winding 50. The spaced portion 41h includes the pair of conductive surfaces, the first conductive surface 41d1 and the second conductive surface 41d2, and is spaced from the proximal end portion 41i facing the other end 41b side toward the other end 41b side. That is, the spaced portion 41h is a curved portion on the rear surface side of the terminal member 41 indicated by the broken line in FIG. 17A.

Furthermore, the connecting device 300 presses the distal end pressing member 303 toward the distal end portion 41j while the proximal end portion 41i is being sandwiched by the right pressing portion 301a and the left pressing portion 302a, to deform and pressure bond the distal end portion 41j to the winding 50, as illustrated in FIG. 17C. The distal end portion 41j is a portion including the pair of conductive surfaces, the first conductive surface 41d1 and the second conductive surface 41d2, and that extends from the proximal end portion 41i, facing the other end 41b side, to the other end 41a side. Here, the connecting device 300 deforms the winding 50 together with the distal end portion 41j. Through the steps from FIG. 17A to FIG. 17C, the connecting device 300 carries out pressure bonding so that the spaced portion 41h, the proximal end portion 41i, and the distal end portion 41j portions of the terminal member 41 form an annular shape that surrounds the winding 50.

The method for connecting the terminal member 41 and the winding 50 according to the fourth embodiment described above provides actions and effects by means of the following configurations.

The method for connecting a terminal member 41 and a winding 50 is for connecting a winding 50, and a terminal member 41 comprising a pair of conductive surfaces, a first conductive surface 41d1 and a second conductive surface 41d2, having a plate shape extending from one end 41a toward the other end 41b and provided with a front surface 41c and a rear surface 41d, respectively projecting from the front surface 41c to the rear surface 41d side at the one end 41a, and opposite each other along a direction that intersects the direction from the one end 41a toward the other end 41b. In this method for connecting a terminal member 41 and a conductive member 50, the winding 50 is positioned between a pair of opposing conductive surfaces, the first conductive surface 41d1 and the second conductive surface 41d2, and at least a portion of the pair of opposing conductive surfaces, the first conductive surface 41d1 and the second conductive surface 41d2, is pressed toward the winding 50 and deformed to be connected with the winding 50.

According to the method for connecting a terminal member 41 and a winding 50 configured in this manner, it is possible to sufficiently join the terminal member 41 and the winding 50 by means of a simple method in which at least a portion of a pair of conductive surfaces, a first conductive surface 41d1 and a second conductive surface 41d2, is pressed toward the winding 50 and deformed to be connected with the winding 50.

In particular, according to this connection method, since the terminal member 41 deforms without heating when the terminal member 41 and the winding 50 are joined, a control or a device for heating is not required. Therefore, the connection of the terminal member 41 and the winding 50 can be carried out with low-cost equipment. Moreover, since a high electric power for heating the terminal member 41 is not required, connection of the terminal member 41 and the winding 50 can be carried out at low cost. Furthermore, since the terminal member 41 is deformed without heating when the terminal member 41 and the winding 50 are joined, heat is not conducted to heat members with insufficient heat resistance. That is, a control or a device for heat dissipation and cooling is not required.

Furthermore, in this method for connecting a terminal member 41 and a winding 50, a proximal end portion 41i including the pair of conductive surfaces, the first conductive surface 41d1 and the second conductive surface 41d2, and facing the other end 41b side, is deformed and connected to the winding 50.

According to the method for connecting a terminal member 41 and a winding 50 configured in this manner, it is possible to strongly connect the terminal member 41 to the winding 50, by deforming, and pressure bonding to the winding 50, at least the proximal end portion 41i of the terminal member 41. Furthermore, since a surface onto which the winding 50 is pressed is not required, it is possible to easily join at least the proximal end portion 41i of the terminal member 41, even if an error has occurred in the position of the winding 50.

Furthermore, in this method for connecting a terminal member 41 and a winding 50, a distal end portion 41j, which extends to the one end 41a side from the proximal end portion 41i including the pair of conductive surfaces, the first conductive surface 41d1 and the second conductive surface 41d2, and facing the other end 41b side, is deformed and connected to the winding 50.

According to the method for connecting a terminal member 41 and a winding 50 configured in this manner, it is possible to strongly connect the terminal member 41 to the winding 50, by deforming, and pressure bonding to the winding 50, at least the distal end portion 41j of the terminal member 41. Furthermore, since a surface onto which the winding 50 is pressed is not required, it is possible to easily join at least the distal end portion 41j of the terminal member 41, even if an error has occurred in the position of the winding 50.

Furthermore, in this method for connecting a terminal member 41 and a winding 50, a spaced portion 41h which is spaced from the other end 41b side from the proximal end portion 41i including the pair of conductive surfaces, the first conductive surface 41d1 and the second conductive surface 41d2, and facing the other end 41b side, is deformed toward the winding 50 and connected to the winding 50.

According to the method for connecting a terminal member 41 and a winding 50 configured in this manner, it is possible to strongly connect the terminal member 41 to the winding 50, by deforming, and pressure bonding to the winding 50, at least the spaced portion 41h of the terminal member 41. Furthermore, since a surface onto which the winding 50 is pressed is not required, it is possible to easily join at least the spaced portion 41h of the terminal member 41, even if an error has occurred in the position of the winding 50.

Furthermore, in this method for connecting a terminal member 41 and a winding 50, a portion including the pair of conductive surfaces, the first conductive surface 41d1 and the second conductive surface 41d2, is deformed together with the winding 50 and connected to the winding 50.

According to the method for connecting a terminal member 41 and a winding 50 configured in this manner, since the terminal member 41 and the winding 50 are both deformed, it is possible to make the terminal member 41 and the winding 50 bite into each other, so as to be more strongly connected.

Other than the foregoing, various modifications to the present invention based on the configurations described in the Claims are possible, which also belong in the scope of the present invention.

For example, the bus ring 20 described in the second embodiment may be configured to use the terminal member 12 according to the modified example of the first embodiment, instead of the terminal member 21. In addition, the bus ring assembly 40 described in the third embodiment may be configured using a bus ring that includes the terminal member 12 according to the modified example of the first embodiment, or the bus ring 30 according to the modified example of the second embodiment.

The invention claimed is:

1. A method for manufacturing a terminal member for electrical conduction with a conductive member, the method comprising:
    working a workpiece having a plate shape with a first surface and a second surface extending from one end toward the other end, by cutting out a recessed portion at the one end from the first surface to the second surface;
    supporting the recessed portion by abutting against a supporting member; and
    fixing a portion of the workpiece spaced from the recessed portion toward the other end side, and pressing both side portions from the first surface toward the second surface along the recessed portion at the one end to form a pair of conductive surfaces for conduction with the conductive member such that the second surface portions faces each other with the supporting member interposed therebetween.

2. The method for manufacturing a terminal member according to claim 1, wherein
    the pressing of the side portions of the workpiece to be bent excludes pressing a portion between the portion of the workpiece being fixed and the other end.

3. The method for manufacturing a terminal member according to claim 1, wherein
    the pressing of the portions of the workpiece to be bent, which are spaced respectively from the supporting member along both sides of the one end by a distance equal to or greater than a thickness between the first surface and the second surface.

4. A method for connecting a conductive member and a terminal member that has a pair of conductive surfaces having a plate shape with a first surface and a second surface extending from one end toward the other end, respectively, and projecting at the one end from the first surface towards a side with the second surface, and opposite each other along a direction that intersects a direction from the one end toward the other end, the method comprising:
    positioning the conductive member between the pair of the conductive surfaces opposing each other; and
    pressing and deforming at least a portion of the pair of the conductive surfaces toward the conductive member to be connected with the conductive member.

5. The method for connecting the conductive member and the terminal member according to claim 4, wherein
    connecting a proximal end portion including the pair of the conductive surfaces facing the other end to the conductive member by deforming the proximal end portion.

6. The method for connecting the conductive member and the terminal member according to claim 5, wherein
    connecting a distal end portion that extends to the one end side from the proximal end portion to the conductive member by deforming the distal end portion.

7. The method for connecting the conductive member and the terminal member according to claim 5, wherein
    connecting a spaced portion that is spaced from the proximal end portion to the conductive member by deforming the spaced portion toward the conductive member.

8. The method for connecting the conductive member and the terminal member according to claim 4, wherein
    connecting a portion including the pair of the conductive surfaces to the conductive member by deforming together with the conductive member.

9. A terminal member joined to a conductive member for electrical conduction therewith, the terminal member comprising:
    a conductive portion comprising a pair of conductive surfaces having a plate shape with a first surface and a second surface extending from one end toward the other end, respectively projecting from the first surface to a side with the second surface, and opposite each other along a direction that intersects a direction from the one end toward the other end; and
    a supporting portion that extends from the conductive portion toward the other end side and supports the conductive portion,
    the supporting portion having a longer width along a direction in which the pair of the conductive surfaces face each other than that of the conductive portion, and
    a portion of the conductive portion including the pair of the conductive surfaces being deformed together with the conductive member so as to be connected to the conductive member.

10. A wiring member comprising: a terminal member having a conductive portion with a pair of conductive surfaces having a plate shape with a first surface and a second surface extending from one end toward the other end, respectively, and projecting from the first surface to a side with the second surface, and opposite each other along a direction that intersects a direction from the one end toward the other end, and a supporting portion extending from the conductive portion toward the other end side and supports the conductive portion, in which a width of the supporting portion along a direction which the pair of conductive surfaces face each other, is longer than that of the conductive portion, and a conductive band member having an elongated shape with conductivity, joining a plurality of the terminal members along a longitudinal direction at a predetermined interval and conducts electric power supplied from outside to each of the terminal members, the supporting portion being connected to the conductive band member by locally melting a portion where the supporting portion abuts against the conductive band member.

* * * * *